US008774226B2

(12) United States Patent
Guo et al.

(10) Patent No.: US 8,774,226 B2
(45) Date of Patent: *Jul. 8, 2014

(54) METHOD AND DEVICE FOR GENERATING AND MAPPING CHANNEL STATE INFORMATION REFERENCE SIGNAL SEQUENCE

(71) Applicant: ZTE Corporation, Shenzhen (CN)

(72) Inventors: Senbao Guo, Shenzhen (CN); Yunfeng Sun, Shenzhen (CN); Changqing Zhu, Shenzhen (CN); Chenchen Zhang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 142 days.

This patent is subject to a terminal disclaimer.

(21) Appl. No.: 13/658,338

(22) Filed: Oct. 23, 2012

(65) Prior Publication Data

US 2013/0044728 A1    Feb. 21, 2013

Related U.S. Application Data

(63) Continuation of application No. 13/501,470, filed as application No. PCT/CN2011/000738 on Apr. 26, 2011, now Pat. No. 8,571,067.

(30) Foreign Application Priority Data

Sep. 29, 2010   (CN) .......................... 2010 1 0503819

(51) Int. Cl.
*H04W 56/00* (2009.01)
*H04L 5/00* (2006.01)
*H04L 1/00* (2006.01)
*H04W 48/12* (2009.01)

(52) U.S. Cl.
CPC ............ *H04L 1/0027* (2013.01); *H04L 5/0048* (2013.01); *H04L 1/0026* (2013.01); *H04W 48/12* (2013.01)
USPC ......... 370/491; 370/332; 370/500; 455/422.1

(58) Field of Classification Search
USPC .............. 370/310.2, 328–339, 349, 491, 500; 455/422.1
See application file for complete search history.

(56) References Cited

U.S. PATENT DOCUMENTS

| | | |
|---|---|---|
| 2009/0185607 A1 | 7/2009 | Lee |
| 2012/0176939 A1 | 7/2012 | Qu et al. |
| 2012/0220333 A1 | 8/2012 | Zhu |
| 2012/0300653 A1 | 11/2012 | Kishiyama et al. |
| 2013/0003788 A1 | 1/2013 | Marinier et al. |
| 2013/0044728 A1 | 2/2013 | Guo et al. |

FOREIGN PATENT DOCUMENTS

| | | |
|---|---|---|
| WO | 2010/087644 A2 | 8/2010 |
| WO | 2010105566 A1 | 9/2010 |
| WO | 2010107230 A2 | 9/2010 |

OTHER PUBLICATIONS

International Search Report dated Jul. 28, 2011 for PCT/CN2011/000738.
3GPP TS 36.211 V9.1.0 3rd Generation Partnership Project; Technical Specification Group Radio Access Network; Evolved Universal Terrestrial Radio Access (E-UTRA); Physical Channels and Modulation (Release 9), Mar. 2010.
Notice of Allowance dated Aug. 7, 2013 of related case U.S. Appl. No. 13/501,470.

*Primary Examiner* — Hoon J Chung
(74) *Attorney, Agent, or Firm* — Banner & Witcoff, Ltd.

(57) ABSTRACT

The present invention provides a method and device for generating and mapping a Channel State Information Reference Signal (CSI-RS) sequence, and the method includes: generating a pseudo-random sequence according to a pseudo-random sequence initial value, performing a Quadrature Phase- Shift Keying (QPSK) modulation on the pseudo-random sequence, and obtaining a first CSI-RS sequence according to maximum bandwidth of system; and cutting the first CSI-RS sequence according to the actual bandwidth of the system, obtaining a second CSI-RS sequence, and mapping the second CSI-RS sequence to a time frequency location of a CSI-RS antenna port. The CSI-RS reference signal sequence can be generated or obtained respectively at the UE terminal and eNB terminal in accordance with the stated methods for generating and mapping the reference sequence according to known parameters by the present invention, so that the calculated CSI-RS sequence can be utilized to measure the channel at the UE terminal.

11 Claims, 9 Drawing Sheets

METHOD AND DEVICE FOR GENERATING AND MAPPING CHANNEL STATE INFORMATION REFERENCE SIGNAL SEQUENCE

CROSS-REFERENCE TO RELATED APPLICATIONS

This application is a continuation application of U.S. patent Ser. No. 13/501,470, filed on Apr. 12, 2012, and entitled "Method and Device for Generating and Mapping Channel State Information Reference Signal Sequence", the disclosure of which is incorporated herein by reference in its entirety for all purposes.

TECHNICAL FIELD

The present invention relates to a Long term evolution advanced (LTE-A) system, and more especially, to a method and device for generating and mapping a Channel State Information Reference Signal (CSI-RS) sequence in the LTE-A system.

BACKGROUND OF THE RELATED ART

In the Long term evolution (LTE) Release 10 (R10), to further improve the average frequency spectrum utilization rate and border frequency spectrum utilization rate of a cell and the throughput rate of each User Equipment (UE), two reference signals (also called the pilot) are respectively defined: a Channel State Information Reference Signal (CRI-RS) and a Demodulation Reference Signal (DMRS), wherein the CRI-RS is used for measuring a channel, and a Precoding Matrix Indicator (PMI), Channel Quality Indicator (CQI) and Rank Indicator (RI) which are required to be fed back by the UE to an evolved Node B (eNB) can be calculated through measuring the CRI-RS. The distribution of the CSI-RS in time domain and frequency domain which was formerly defined by the 3GPP LTE-A RAN1 61 bis conference is sparse, and it shall guarantee that only pilot density of one CSI-RS on each antenna port in a serving cell is included within a Resource Block (RB), and the multiple of 5 ms is taken as a period of the CSI-RS in time domain. During the 3GPP LTE-A RAN1 61 bis conference, the patterns under Normal Cyclic Prefix (Normal CP) and Extended Cyclic Prefix (Extended CP) were respectively defined for Frequency Division Duplexing (FDD) system and Time Division Duplexing (TDD) system (refer to FIG. 1~FIG. 8), wherein one CSI-RS antenna port multiplexes with another CSI-RS antenna port by means of Code Division Multiple (CDM), two Orthogonal Frequency Division Multiplexing (OFDM) symbols are occupied in the time domain, and Resource Element (RE) of one CSI-RS antenna port is included in one RB in the frequency domain.

However, the existing technology doesn't relate to how to generate and map the CSI-RS sequence.

SUMMARY OF THE INVENTION

The purpose of the present invention is to provide a method and device for generating and mapping a channel state information reference signal sequence, to meet the requirements for the application of the Channel State Information Reference Signal in the LTE-A technique.

In order to solve the above problems, the present invention provides a method for generating and mapping the Channel State Information Reference Signal (CSI-RS) sequence, which comprises:

generating a pseudo-random sequence according to a pseudo-random sequence initial value, performing a Quadrature Phase-Shift Keying (QPSK) modulation on the pseudo-random sequence, and obtaining a first CSI-RS sequence according to maximum bandwidth of system; and cutting the first CSI-RS sequence according to actual bandwidth of the system, obtaining a second CSI-RS sequence, and mapping the second CSI-RS sequence to a time frequency location of a CSI-RS antenna port.

The method can generate the first CSI-RS sequence, cut the first CSI-RS sequence to obtain the second CSI-RS sequence and map the second CSI-RS sequence based on an Orthogonal Frequency Division Multiplexing (OFDM) symbol or a subframe; wherein when the second CSI-RS sequence is mapped based on the OFDM symbol, the second CSI-RS sequences mapped on two OFDM symbols which are located in the same Code Division Multiple (CDM) group are produced from different first CSI-RS sequences;

when the second CSI-RS sequence is mapped based on the subframe, the second CSI-RS sequences mapped on the two OFDM symbols which are located in the same CDM group are produced from different parts of same first CSI-RS sequence.

The method can generate the first CSI-RS sequence, cut the first CSI-RS sequence to obtain the second CSI-RS sequence and map the second CSI-RS sequence based on the OFDM symbol; and the method can further comprises: obtaining the pseudo-random sequence initial value according to a time slot index, an OFDM symbol index in one time slot and a cell identity (ID), or obtaining the pseudo-random sequence initial value according to one or more of three parameters of a CSI-RS antenna port number related parameter, a CSI-RS antenna port index related parameter and a Cyclic Prefix (CP) length factor, and the time slot index, the OFDM symbol index in one time slot and the cell ID.

The pseudo-random sequence initial value $c_{init}$ can be one of the following values:

$c_{init} = 2^9 \cdot (7 \cdot (n_s+1)+l+1) \cdot (2 \cdot N_{ID}^{cell}+1) + N_{ID}^{cell}$;

$c_{init} = 2^9 \cdot (7 \cdot (n_s+1)+l+1) \cdot (2 \cdot N_{ID}^{cell}+1)$;

$c_{init} = (7 \cdot (n_s+1)+l+1) \cdot (2 \cdot N_{ID}^{cell}+1)$;

$c_{init} = 2^{10} \cdot (7 \cdot (n_s+1)+l+1) \cdot (2 \cdot N_{ID}^{cell}+1) + 2 \cdot + N_{ID}^{cell} N_{CP}$;

$c_{init} = 2^{10} \cdot (7 \cdot (n_s+1)+l+1) \cdot (2 \cdot N_{ID}^{cell}+1) + N_{CP}$;

$c_{init} = 2 \cdot (7 \cdot (n_s+1)+l+1) \cdot (2 \cdot N_{ID}^{cell}+1) + N_{CP}$;

$c_{init} = 2^9 \cdot (7 \cdot (n_s+1)+l+1) \cdot (2 \cdot N_{ID}^{cell}+1) \cdot (2 \cdot \lfloor ANTPORT/4 \rfloor+1) + N_{ID}^{cell}$;

$c_{init} = 2^9 \cdot (7 \cdot (n_s+1)+l+1) \cdot (2 \cdot N_{ID}^{cell}+1) \cdot (2 \cdot \lfloor ANTPORT/2 \rfloor+1) + N_{ID}^{cell}$;

$c_{init} = (7 \cdot (n_s+1)+l+1) \cdot (2 \cdot N_{ID}^{cell}+1) \cdot (2 \cdot \lfloor ANTPORT/4 \rfloor+1)$;

$c_{init} = (7 \cdot (n_s+1)+l+1) \cdot (2 \cdot N_{ID}^{cell}+1) \cdot (2 \cdot \lfloor ANTPORT/2 \rfloor+1)$;

$c_{init} = 4 \cdot (7 \cdot (n_s+1)+l+1) \cdot (2 \cdot N_{ID}^{cell}+1) + \lfloor ANTPORT/2 \rfloor$;

$c_{init} = 2 \cdot (7 \cdot (n_s+1)+l+1) \cdot (2 \cdot N_{ID}^{cell}+1) + \lfloor ANTPORT/4 \rfloor$;

$c_{init} = 2^9 \cdot (7 \cdot (n_s+1)+l+1) \cdot (2 \cdot N_{ID}^{cell}+1) + \lfloor ANTPORT/2 \rfloor$;

$c_{init} = 2^9 \cdot (7 \cdot (n_s+1)+l+1) \cdot (2 \cdot N_{ID}^{cell}+1) + \lfloor ANTPORT/4 \rfloor$;

$c_{init}=2^{10}\cdot(7\cdot(n_s+1)+l+1)\cdot(2\cdot N_{ID}^{cell}+1)+\lfloor ANTPORT/2\rfloor;$ $c_{init}=2^{10}\cdot(7\cdot(n_s+1)+l+1)\cdot(2\cdot N_{ID}^{cell}+1)+\lfloor ANTPORT/4\rfloor;$ $c_{init}=2^{10}\cdot(7\cdot(n_s+1)+l+1)\cdot(2\cdot N_{ID}^{cell}+1)+\lfloor ANTPORT/2\rfloor;$ $c_{init}=2^{10}\cdot(7\cdot(n_s+1)+l+1)\cdot(2\cdot N_{ID}^{cell}+1)+2\cdot N_{ID}^{cell}+\lfloor ANTPORT/4\rfloor;$ $c_{init}=2^{11}\cdot(7\cdot(n_s+1)+l+1)\cdot(2\cdot N_{ID}^{cell}+1)+4\cdot N_{ID}^{cell}+\lfloor ANTPORT/2\rfloor;$ $c_{init}=2^{10}\cdot(7\cdot(n_s+1)+l+1)\cdot(2\cdot N_{ID}^{cell}+1)\cdot(2\cdot\lfloor ANTPORT/4\rfloor+1)+2N_{ID}^{cell}+N_{CP};$ $c_{init}=2^{10}\cdot(7\cdot(n_s+1)+l+1)\cdot(2\cdot N_{ID}^{cell}+1)\cdot(2\cdot\lfloor ANTPORT/2\rfloor+1)+2N_{ID}^{cell}+N_{CP};$ $c_{init}=2\cdot(7\cdot(n_s+1)+l+1)\cdot(2\cdot N_{ID}^{cell}+1)\cdot(2\cdot\lfloor ANTPORT/4\rfloor+1)+1)+N_{CP};$ $c_{init}=8\cdot(7\cdot(n_s+1)+l+1)\cdot(2\cdot N_{ID}^{cell}+1)+2\cdot\lfloor ANTPORT/2\rfloor+N_{CP};$ $c_{init}=4\cdot(7\cdot(n_s+1)+l+1)\cdot(2\cdot N_{ID}^{cell}+1)+2\cdot\lfloor ANTPORT/4\rfloor+N_{CP};$ $c_{init}=2^9\cdot(7\cdot(n_s+1)+l+1)\cdot(2\cdot N_{ID}^{cell}+1)+2\cdot\lfloor ANTPORT/2\rfloor+N_{CP};$ $c_{init}=2^9\cdot(7\cdot(n_s+1)+l+1)\cdot(2\cdot N_{ID}^{cell}+1)+2\cdot\lfloor ANTPORT/4\rfloor+N_{CP};$ $c_{init}=2^{10}\cdot(7\cdot(n_s+1)+l+1)\cdot(2\cdot N_{ID}^{cell}+1)+2\cdot\lfloor ANTPORT/4\rfloor+N_{CP};$ $c_{init}=2^{10}\cdot(7\cdot(n_s+1)+l+1)\cdot(2\cdot N_{ID}^{cell}+1)+2\cdot\lfloor ANTPORT/2\rfloor+N_{CP};$ $c_{init}=2^9\cdot(7\cdot(n_s+1)+l+1)\cdot(2\cdot N_{ID}^{cell}+1)\cdot 2\cdot ANTPORTNUM+1)+N_{ID}^{cell};$ $c_{init}=2^9\cdot(7\cdot(n_s+1)+l+1)\cdot(2\cdot N_{ID}^{cell}+1)\cdot 2\cdot ANTPORTNUM+1);$ $c_{init}=2^{11}\cdot(7\cdot(n_s+1)+l+1)\cdot(2\cdot N_{ID}^{cell}+1)+4N_{ID}^{cell}+ANTPORTNUM;$ $c_{init}=2^9\cdot(7\cdot(n_s+1)+l+1)\cdot(2\cdot N_{ID}^{cell}+1)+ANTPORTNUM;$ $c_{init}=4\cdot(7\cdot(n_s+1)+l+1)\cdot(2\cdot N_{ID}^{cell}+1)+ANTPORTNUM;$ $c_{init}=2^9\cdot(7\cdot(n_s+1)+l+1)\cdot(2\cdot N_{ID}^{cell}+1)\cdot(2\cdot ANTPORTNUM+1)+N_{ID}^{cell};$ $c_{init}=2^{11}\cdot(7\cdot(n_s+1)+l+1)\cdot(2\cdot N_{ID}^{cell}+1)+4N_{ID}^{cell}+ANTPORTNUM;$ $c_{init}=2^{12}\cdot(7\cdot(n_s+1)+l+1)\cdot(2\cdot N_{ID}^{cell}+1)+8N_{ID}^{cell}+4N_{CP}+ANTPORTNUM;$ $c_{init}=2^9\cdot(7\cdot(n_s+1)+l+1)\cdot(2\cdot N_{ID}^{cell}+1)+4N_{CP}+ANTPORTNUM;$ $c_{init}=8\cdot(7\cdot(n_s+1)+l+1)\cdot(2\cdot N_{ID}^{cell}+1)+4N_{CP}+ANTPORTNUM;$ $c_{init}=2^{12}\cdot(7\cdot(n_s+1)+l+1)\cdot(2\cdot N_{ID}^{cell}+1)+8N_{ID}^{cell}+2ANTPORTNUM+N_{CP};$ $c_{init}=2^9\cdot(7\cdot(n_s+1)+l+1)\cdot(2\cdot N_{ID}^{cell}+1)+2ANTPORTNUM+N_{CP};$ $c_{init}=8\cdot(7\cdot(n_s+1)+l+1)\cdot(2\cdot N_{ID}^{cell}+1)+2ANTPORTNUM+N_{CP};$ $c_{init}=2^{11}\cdot(7\cdot(n_s+1)+l+1)\cdot(2\cdot N_{ID}^{cell}+1)(2\cdot\lfloor ANTPORT/4\rfloor+1)+4N_{ID}^{cell}+ANTPORTNUM;$ $c_{init}=2^9\cdot(7\cdot(n_s+1)+l+1)\cdot(2\cdot N_{ID}^{cell}+1)(2\cdot\lfloor ANTPORT/4\rfloor+1)+ANTPORTNUM;$ $c_{init}=4\cdot(7\cdot(n_s+1)+l+1)\cdot(2\cdot N_{ID}^{cell}+1)(2\cdot\lfloor ANTPORT/4\rfloor+1)+ANTPORTNUM;$ $c_{init}=2^{10}\cdot(7\cdot(n_s+1)+l+1)\cdot(2\cdot N_{ID}^{cell}+1)+8\cdot\lfloor ANTPORT/4\rfloor+ANTPORTNUM;$ $c_{init}=2^{10}\cdot(7\cdot(n_s+1)+l+1)\cdot(2\cdot N_{ID}^{cell}+1)+8\cdot\lfloor ANTPORT/2\rfloor+ANTPORTNUM;$ $c_{init}=2^9\cdot(7\cdot(n_s+1)+l+1)\cdot(2\cdot N_{ID}^{cell}+1)(2\cdot\lfloor ANTPORT/4\rfloor+1)+8N_{ID}^{cell}+4N_{CP}+ANTPORTNUM;$ $c_{init}=2^9\cdot(7\cdot(n_s+1)+l+1)\cdot(2\cdot N_{ID}^{cell}+1)(2\cdot\lfloor ANTPORT/4\rfloor+1)+4N_{CP}+ANTPORTNUM;$ $c_{init}=2^{12}\cdot(7\cdot(n_s+1)+l+1)\cdot(2\cdot N_{ID}^{cell}+1)(2\cdot\lfloor ANTPORT/4\rfloor+1)+8N_{ID}^{cell}+2ANTPORTNUM+N_{CP};$ $c_{init}=2^9\cdot(7\cdot(n_s+1)+l+1)\cdot(2\cdot N_{ID}^{cell}+1)(2\cdot\lfloor ANTPORT/4\rfloor+1)+2ANTPORTNUM+N_{CP};$ $c_{init}=8\cdot(7\cdot(n_s+1)+l+1)\cdot(2\cdot N_{ID}^{cell}+1)(2\cdot\lfloor ANTPORT/4\rfloor+1)+2ANTPORTNUM+N_{CP};$ $c_{init}=2^{10}\cdot(7\cdot(n_s+1)+l+1)\cdot(2\cdot N_{ID}^{cell}+1)+8\cdot\lfloor ANTPORT/2\rfloor+ANTPORTNUM+N_{CP};$ wherein, $n_s$ is the time slot index in one radio frame, l is the OFDM index in one time slot, $N_{ID}^{cell}$ is the cell ID, and $N_{CP}$ is the Cyclic Prefix (CP) length factor. When a subframe is a normal CP subframe, $N_{CP}=1$, and when the subframe is an extended CP subframe, $N_{CP}=0$, ANTPORT is the CSI-RS antenna port index related parameter, and ANTPORTNUM is the CSI-RS antenna port number related parameter of cell.

The method can generate the first CSI-RS sequence, cut the first CSI-RS sequence to obtain the second CSI-RS sequence and map the second CSI-RS sequence based on the subframe, and the method can further comprise:

obtaining the pseudo-random sequence initial value according to the time slot index and cell ID; or obtaining the pseudo-random sequence initial value according to one or more of three parameters of the CSI-RS antenna port number related parameter, the CSI-RS antenna port index related parameter and the Cyclic Prefix (CP) length factor, and the time slot index and the cell ID.

The pseudo-random sequence initial value $c_{init}$ can be one of the following values:

$c_{init}=(\lfloor n_s/2\rfloor+1)\cdot(2N_{ID}^{cell}+1)\cdot 2^{16};$ $c_{init}=(\lfloor n_s/2\rfloor+1)\cdot(2N_{ID}^{cell}+1);$ $c_{init}=(\lfloor n_s/2\rfloor+1)\cdot(2N_{ID}^{cell}+1)\cdot 2^{16}+N_{ID}^{cell};$ $c_{init}=(\lfloor n_s/2\rfloor+1)\cdot(2N_{ID}^{cell}+1)\cdot 2^9+N_{ID}^{cell};$ $c_{init}=(\lfloor n_s/2\rfloor+1)\cdot(2N_{ID}^{cell}+1)\cdot 2^{16}+N_{ID}^{cell}+N^{CP};$ $c_{init}=(\lfloor n_s/2\rfloor+1)\cdot(2N_{ID}^{cell}+1)\cdot 2^{16}+N_{CP};$ $c_{init}=(\lfloor n_s/2\rfloor+1)\cdot(2N_{ID}^{cell}+1)\cdot 2^{10}+2N_{ID}^{cell}+_{CP};$ $c_{init}=(\lfloor n_s/2\rfloor+1)\cdot(2N_{ID}^{cell}+1)\cdot(2\cdot\lfloor ANTPORT/2\rfloor+1)\cdot 2^9+N_{ID}^{cell};$ $c_{init}=(\lfloor n_s/2\rfloor+1)\cdot(2N_{ID}^{cell}+1)\cdot(2\cdot\lfloor ANTPORT/4\rfloor+1)\cdot 2^9+N_{ID}^{cell};$ $c_{init}=(\lfloor n_s/2 \rfloor+1) \cdot (2N_{ID}^{cell}+1) \cdot (2 \cdot \lfloor ANTPORT/2 \rfloor+1);$ $c_{init}=(\lfloor n_s/2 \rfloor+1) \cdot (2N_{ID}^{cell}+1) \cdot 2^{16}+\lfloor ANTPORT/2 \rfloor;$ $c_{init}=(\lfloor n_s/2 \rfloor+1) \cdot (2N_{ID}^{cell}+1) \cdot 2^{16}+\lfloor ANTPORT/4 \rfloor;$ $c_{init}=(\lfloor n_s/2 \rfloor+1) \cdot (2N_{ID}^{cell}+1) \cdot (2 \cdot \lfloor ANTPORT/2 \rfloor+1) \cdot 2^{10}+2N_{ID}^{cell}+N_{CP};$ $c_{init}=(\lfloor n_s/2 \rfloor+1) \cdot (2N_{ID}^{cell}+1) \cdot (2 \cdot \lfloor ANTPORT/4 \rfloor+1) \cdot 2^{10}+2N_{ID}^{cell}+N_{CP};$ $c_{init}=(\lfloor n_s/2 \rfloor+1) \cdot (2N_{ID}^{cell}+1) \cdot (2 \cdot \lfloor ANTPORT/4 \rfloor+1) \cdot 2+N_{CP};$ $c_{init}=2^{16} \cdot (\lfloor n_s/2 \rfloor+1) \cdot (2N_{ID}^{cell}+1) \cdot 2 \cdot \lfloor ANTPORT/4 \rfloor+N_{CP};$ $c_{init}=2^{16} \cdot (\lfloor n_s/2 \rfloor+1) \cdot (2N_{ID}^{cell}+1) \cdot 2 \cdot \lfloor ANTPORT/2 \rfloor+N_{CP};$ $c_{init}=(\lfloor n_s/2 \rfloor+1) \cdot (2N_{ID}^{cell}+1) \cdot (2 \cdot ANTPORTNUM+1) \cdot 2^{10}+2N_{ID}^{cell}+N_{CP};$ $c_{init}=(\lfloor n_s/2 \rfloor+1) \cdot (2N_{ID}^{cell}+1) \cdot 2^{12}+8N_{ID}^{cell}+4N_{CP}+ANTPORTNUM;$ $c_{init}=(\lfloor n_s/2 \rfloor+1) \cdot (2N_{ID}^{cell}+1) \cdot 2^{12}+8N_{ID}^{cell}+2ANTPORTNUM+N_{CP};$ $c_{init}=(\lfloor n_s/2 \rfloor+1) \cdot (2N_{ID}^{cell}+1) \cdot 2^3+2ANTPORTNUM+N_{CP};$ $c_{init}=(\lfloor n_s/2 \rfloor+1) \cdot (2N_{ID}^{cell}+1) \cdot 2^3 4N_{CP}+ANTPORTNUM;$ $c_{init}=(\lfloor n_s/2 \rfloor+1) \cdot (2N_{ID}^{cell}+1) \cdot (2 \cdot ANTPORTNUM+1) \cdot 2^9+N_{ID}^{cell};$ $c_{init}=(\lfloor n_s/2 \rfloor+1) \cdot (2N_{ID}^{cell}+1) \cdot (2 \cdot ANTPORTNUM+1);$ $c_{init}=(\lfloor n_s/2 \rfloor+1) \cdot (2N_{ID}^{cell}+1) \cdot 2^{16}+ANTPORTNUM;$ $c_{init}=(\lfloor n_s/2 \rfloor+1) \cdot (2N_{ID}^{cell}+1) \cdot 4+ANTPORTNUM;$ $c_{init}=(\lfloor n_s/2 \rfloor+1) \cdot (2N_{ID}^{cell}+1) \cdot 2^{11}+4N_{ID}^{cell}+ANTPORTNUM;$ $c_{init}=(\lfloor n_s/2 \rfloor+1) \cdot (2N_{ID}^{cell}+1) \cdot (2 \cdot \lfloor ANTPORT/4 \rfloor+1) \cdot 2^{11}+4N_{ID}^{cell}+ANTPORTNUM;$ $c_{init}=(\lfloor n_s/2 \rfloor+1) \cdot (2N_{ID}^{cell}+1) \cdot (2 \cdot \lfloor ANTPORT/4 \rfloor+1) \cdot 4+ANTPORTNUM;$ $c_{init}=(\lfloor n_s/2 \rfloor+1) \cdot (2N_{ID}^{cell}+1) \cdot (2 \cdot \lfloor ANTPORT/4 \rfloor+1) \cdot 2^{16}+ANTPORTNUM;$ $c_{init}=(\lfloor n_s/2 \rfloor+1) \cdot (2N_{ID}^{cell}+1) \cdot 2^{16}+8 \cdot \lfloor ANTPORT/2 \rfloor++ANTPORTNUM;$ $c_{init}=(\lfloor n_s/2 \rfloor+1) \cdot (2N_{ID}^{cell}+1) \cdot 2^{16}+8 \cdot \lfloor ANTPORT/4 \rfloor++ANTPORTNUM;$ $c_{init}=(\lfloor n_s/2 \rfloor+1) \cdot (2N_{ID}^{cell}+1) \cdot 2^{16}+2^4 \cdot \lfloor ANTPORT/2 \rfloor+2 \cdot ANTPORTNUM+N_{CP};$ $c_{init}=(\lfloor n_s/2 \rfloor+1) \cdot (2N_{ID}^{cell}+1) \cdot 2^{16}+2^4 \cdot \lfloor ANTPORT/4 \rfloor+2 \cdot ANTPORTNUM+N_{CP};$ wherein, $n_s$ is the time slot index in one radio frame, $N_{ID}^{cell}$ is the cell ID, when the subframe is the normal CP subframe, $N_{CP}=1$, and when the subframe is the extended CP subframe, $N_{CP}=0$, ANTPORT is the CSI-RS antenna port index related parameter, and ANTPORTNUM is the CSI-RS antenna port number related parameter of the cell.

The method can generate the first CSI-RS sequence and cut the first CSI-RS sequence to obtain the second CSI-RS sequence and map the second CSI-RS sequence based on the OFDM symbol; wherein in the step of generating the pseudo-random sequence according to the pseudo-random sequence initial value and performing the QPSK modulation on the pseudo-random sequence to obtain the first CSI-RS sequence, the pseudo-random sequence c(n) can be generated in accordance with the following ways:

$$c(n)=(x_1(n+N_C)+x_2(n+N_C)) \bmod 2$$

$$x_1(n+31)=(x_1(n+3)+x_1(n)) \bmod 2$$

$$x_2(n+31)=(x_2(n+3)+x_2(n+2)+x_2(n+1)+x_2(n)) \bmod 2$$

wherein, $x_1(0)=1$, $x_1(n)=0$, $n=1, 2, \ldots, 30$, $N_C=1600$, $x_2(n)=0$, $n=0, 1, 2, \ldots, 30$ are produced according to the pseudo-random sequence initial value $c_{init}=\Sigma_{q=0}^{30} x_2(q) \cdot 2^q$, and mod is a modular arithmetic; and the first CSI-RS sequence r(m) can be generated in accordance with the following ways:

$$r(m) = \frac{1}{\sqrt{2}}(1 - 2 \cdot c(2m)) + j\frac{1}{\sqrt{2}}(1 - 2 \cdot c(2m + 1)),$$

$$m = 0, 1, \ldots, N_{RB}^{max,DL} - 1$$

or $$r(m) = \frac{1}{\sqrt{2}}(1 - 2 \cdot c(2m)) + j\frac{1}{\sqrt{2}}(1 - 2 \cdot c(2m + 1)),$$

$$m = \left\lceil \frac{1}{2} N_{RB}^{max,DL} \right\rceil, \ldots, \left\lceil \frac{3}{2} N_{RB}^{max,DL} \right\rceil - 1$$

wherein, $N_{RB}^{max,DL}$ is the maximum bandwidth of the system, $N_{RB}^{max,DL}=110$.

The step of cutting the first CSI-RS sequence according to the actual bandwidth of the system can comprise: calculating a location index i' according to the actual bandwidth $N_{RB}^{DL}$ of the system and cutting the first CSI-RS sequence r(m) in accordance with the location index i' to obtain the second CSI-RS sequence $r_{l,n_s}(i')$ of the OFDM symbol l on the time slot $n_s$; and the step of mapping the second CSI-RS sequence to the time frequency location of the CSI-RS antenna port can comprise: mapping the second CSI-RS sequence $r_{l,n_s}(i')$ to a subcarrier k of the OFDM symbol l of CSI-RS antenna port p via $a_{k,l}^{(p)}=w_{l''} \cdot r_{l,n_s}(i')$, wherein, $a_{k,l}^{(p)}$ is a value of RE corresponding to the CSI-RS antenna port p, and $w_{l''}$ is an orthogonal code factor.

The location index can be $$i' = i + \frac{\lfloor N_{RB}^{max,DL} - N_{RB}^{DL} \rfloor}{2}, i = 0, 1 \ldots, N_{RB}^{DL} - 1;$$

in the step of mapping the second CSI-RS sequence $r_{l,n_s}(i')$ to the subcarrier k of the OFDM symbol l of the CSI-RS antenna port p, $a_{k,l}^{(p)}=w_{l''} \cdot r_{l,n_s}(i')$, there is:

$$k = k' + 12i + \begin{cases} -0 & p \in \{15, 16\}, \text{ normal } CP \\ -6 & p \in \{17, 18\}, \text{ normal } CP \\ -1 & p \in \{19, 20\}, \text{ normal } CP \\ -7 & p \in \{21, 22\}, \text{ normal } CP \\ -0 & p \in \{15, 16\}, \text{ extended } CP \\ -3 & p \in \{17, 18\}, \text{ extended } CP \\ -6 & p \in \{19, 20\}, \text{ extended } CP \\ -9 & p \in \{21, 22\}, \text{ extended } CP \end{cases}$$

$$l = \begin{cases} l' & \text{when using the extended } CP \text{ and the subframe structure type 1 or 2, the first symbol of the } CDM \text{ group} \\ l' + 1 & \text{when using the extended } CP \text{ and the subframe structure type 1 or 2, the second symbol of the } CDM \text{ group} \\ l' + 2 & \text{when using the normal } CP \text{ and the subframe structure type 2, the second symbol of the } CDM \text{ group} \end{cases}$$

$$l'' \begin{cases} 0, l = l' \\ 1, l \neq l', \end{cases} \quad w_{l'} = \begin{cases} 1 & p \in \{15, 17, 19, 21\} \\ (-1)^{l''} & p \in \{16, 18, 20, 22\}; \end{cases}$$

wherein, k' is a frequency domain location of first CSI-RS antenna port, l' is an initial time domain location of first CSI-RS antenna port, and the first CSI-RS sequence r(m) is $$r(m) = \frac{1}{\sqrt{2}}(1 - 2 \cdot c(2m)) + j\frac{1}{\sqrt{2}}(1 - 2 \cdot c(2m+1)),$$

$$m = 0, 1, \ldots, N_{RB}^{max,DL} - 1.$$

The location index can be $$i' = i + \left\lfloor \frac{N_{RB}^{max,DL} - N_{RB}^{DL}}{2} \right\rfloor,$$

i=0, 1, . . . , $N_{RB}^{DL}$-1;

in the step of mapping the second CSI-RS sequence $r_{l,n_s}(i')$ to the subcarrier k of the OFDM symbol *l* of the *CSI-RS* antenna port *p*, $a_{k,l}^{(p)} = w_{l''} \cdot r_{l,n_s}(i')$, there is:

$$k = k' + 12i + \begin{cases} -0 & p \in \{15, 16\}, \text{ normal } CP \\ -6 & p \in \{17, 18\}, \text{ normal } CP \\ -1 & p \in \{19, 20\}, \text{ normal } CP \\ -7 & p \in \{21, 22\}, \text{ normal } CP \\ -0 & p \in \{15, 16\}, \text{ extended } CP \\ -3 & p \in \{17, 18\}, \text{ extended } CP \\ -6 & p \in \{19, 20\}, \text{ extended } CP \\ -9 & p \in \{21, 22\}, \text{ extended } CP \end{cases}$$

-continued $$l = l' + \begin{cases} l'' & \text{when using normal } CP, \\ & CSI\text{-}RS \text{ configuration index is } 0 \sim 19 \\ 2l'' & \text{when using normal } CP, \\ & CSI\text{-}RS \text{ configuration index is } 20 \sim 31 \\ l'' & \text{when using extended } CP, \\ & CSI\text{-}RS \text{ configuration index is } 0 \sim 27 \end{cases}$$

$$l'' \in \{0, 1\}, \quad w_{l'} = \begin{cases} 1 & p \in \{15, 17, 19, 21\} \\ (-1)^{l''} & p \in \{16, 18, 20, 22\}, \end{cases}$$

wherein, k' is the frequency domain location of the first CSI-RS antenna port, l' is the initial time domain location of the first CSI-RS antenna port, and the first CSI-RS sequence r(m) is $$r(m) = \frac{1}{\sqrt{2}}(1 - 2 \cdot c(2m)) + j\frac{1}{\sqrt{2}}(1 - 2 \cdot c(2m+1)),$$

$$m = 0, 1, \ldots, N_{RB}^{max,DL} - 1.$$

The location index can be $$i' = \begin{cases} i + \left\lfloor \frac{N_{RB}^{max,DL} - N_{RB}^{DL}}{2} \right\rfloor & l'' = 0 \\ i - N_{RB}^{DL} + \left\lfloor \frac{N_{RB}^{max,DL} - N_{RB}^{DL}}{2} \right\rfloor & l'' = 1, \end{cases} \quad i = 0, 1, \ldots, 2N_{RB}^{DL} - 1,$$

and the first CSI-RS sequence r(m) is cut to obtain the second CSI-RS sequence $r_{l,n_s}(i')$ on the time slot $n_s$ of the OFDM symbol l;

in the step of mapping the second CSI-RS sequence $r_{l,n_s}(i')$ to the subcarrier k of the OFDM symbol l of the CSI-RS antenna port p, $a_{k,l}^{(p)} = w_{l''} \cdot r_{l,n_s}(i')$, there is:

$$k = k' + 12(i \bmod N_{RB}^{DL}) + \begin{cases} -0 & p \in \{15, 16\}, \text{ normal } CP \\ -6 & p \in \{17, 18\}, \text{ normal } CP \\ -1 & p \in \{19, 20\}, \text{ normal } CP \\ -7 & p \in \{21, 22\}, \text{ normal } CP \\ -0 & p \in \{15, 16\}, \text{ extended } CP \\ -3 & p \in \{17, 18\}, \text{ extended } CP \\ -6 & p \in \{19, 20\}, \text{ extended } CP \\ -9 & p \in \{21, 22\}, \text{ extended } CP \end{cases}$$

$$l = l' + \begin{cases} l'' & \text{when using normal } CP, \\ & CSI\text{-}RS \text{ configuration index is } 0 \sim 19 \\ 2l'' & \text{when using normal } CP, \\ & CSI\text{-}RS \text{ configuration index is } 20 \sim 31 \\ l'' & \text{when using extended } CP, \\ & CSI\text{-}RS \text{ configuration index is } 0 \sim 27 \end{cases}$$

$$l'' = \left\lfloor \frac{i}{N_{RB}^{DL}} \right\rfloor \in \{0, 1\}, \quad w_{l'} = \begin{cases} 1 & p \in \{15, 17, 19, 21\} \\ (-1)^{l''} & p \in \{16, 18, 20, 22\}, \end{cases}$$

wherein, k' is the frequency domain location of the first CSI-RS antenna port, l' is the initial time domain location of the first CSI-RS antenna port, and the first CSI-RS sequence r(m) is $$r(m) = \frac{1}{\sqrt{2}}(1 - 2 \cdot c(2m)) + j\frac{1}{\sqrt{2}}(1 - 2 \cdot c(2m+1)),$$

$$m = 0, 1, \ldots, N_{RB}^{max,DL} - 1.$$

The location index can be $$i' = \begin{cases} i + N_{RB}^{max,DL} - \left\lfloor \frac{N_{RB}^{DL}}{2} \right\rfloor & l'' = 0 \\ i - N_{RB}^{DL} + N_{RB}^{max,DL} - \left\lfloor \frac{N_{RB}^{DL}}{2} \right\rfloor & l'' = 1, \end{cases}$$

$$i = 0, 1, \ldots, 2N_{RB}^{DL} - 1;$$

in the step of mapping the second CSI-RS sequence $r_{l,n_s}(i')$ to the subcarrier k of the OFDM symbol l of the CSI-RS antenna port p, $a_{k,l}^{(p)} = w_{l''} \cdot r_{l,n_s}(i')$, there is:

$$k = k' + 12(i \bmod N_{RB}^{DL}) + \begin{cases} -0 & p \in \{15, 16\}, \text{ normal } CP \\ -6 & p \in \{17, 18\}, \text{ normal } CP \\ -1 & p \in \{19, 20\}, \text{ normal } CP \\ -7 & p \in \{21, 22\}, \text{ normal } CP \\ -0 & p \in \{15, 16\}, \text{ extended } CP \\ -3 & p \in \{17, 18\}, \text{ extended } CP \\ -6 & p \in \{19, 20\}, \text{ extended } CP \\ -9 & p \in \{21, 22\}, \text{ extended } CP \end{cases}$$

$$l = l' +$$

$$\begin{cases} l'' & \text{when using normal } CP, CSI\text{-}RS \text{ configuration index is } 0 \sim 19 \\ 2l'' & \text{when using normal } CP, CSI\text{-}RS \text{ configuration index is } 20 \sim 31 \\ l'' & \text{when using extended } CP, CSI\text{-}RS \text{ configuration index is } 0 \sim 27 \end{cases}$$

$$l'' = \lfloor i/N_{RB}^{DL} \rfloor \in \{0, 1\}, w_{l''} = \begin{cases} 1 & p \in \{15, 17, 19, 21\} \\ (-1)^{l''} & p \in \{16, 18, 20, 22\}, \end{cases}$$

wherein, k' is the frequency domain location of the first CSI-RS antenna port, l' is the initial time domain location of the first CSI-RS antenna port, and the first CSI-RS sequence r(m) is $$r(m) = \frac{1}{\sqrt{2}}(1 - 2 \cdot c(2m)) + j\frac{1}{\sqrt{2}}(1 - 2 \cdot c(2m+1)),$$

$$m = \left\lceil \frac{1}{2}N_{RB}^{max,DL} \right\rceil, \ldots, \left\lceil \frac{3}{2}N_{RB}^{max,DL} \right\rceil - 1.$$

The method can generate the first CSI-RS sequence, cut the first CSI-RS sequence to obtain the second CSI-RS sequence and map the second CSI-RS sequence based on the subframe; and in the step of obtaining the pseudo-random sequence according to the pseudo-random sequence initial value and performing the QPSK modulation on the pseudo-random sequence to obtain the first CSI-RS sequence, the pseudo-random sequence c(n) can be generated in accordance with the following ways:

$$c(n) = (x_1(n+N_C) + x_2(n+N_C)) \bmod 2$$

$$x_1(n+31) = (x_1(n+3) + x_1(n)) \bmod 2$$

$$x_2(n+31) = (x_2(n+3) + x_2(n+2) + x_2(n+1) + x_2(n)) \bmod 2$$

wherein, $x_1(0) = 1$, $x_1(n) = 0$, $n = 1, 2, \ldots, 30$, $N_C = 1600$, $x_2(n) = 0$, $n = 0, 1, 2, \ldots, 30$ are produced according to the pseudo-random sequence initial value $c_{init} = \Sigma_{q=0}^{30} x_2(q) \cdot 2^q$, and mod is a modular arithmetic;

the first CSI-RS sequence r(m) can be generated in accordance with the following ways:

$$r(m) = \frac{1}{\sqrt{2}}(1 - 2 \cdot c(2m)) + j\frac{1}{\sqrt{2}}(1 - 2 \cdot c(2m+1)),$$

$$m = 0, 1, \ldots, 2N_{RB}^{max,DL} - 1;$$

wherein, $N_{RB}^{max,DL}$ is the maximum system bandwidth, $N_{RB}^{max,DL} = 110$.

The step of cutting the first CSI-RS sequence according to the actual bandwidth of the system can comprise: calculating a location index i' according to the actual bandwidth of the system and cutting the first CSI-RS sequence r(m) according to the location index i' to obtain the second CSI-RS sequence $r_{n_s}(i')$ on the subframe $$\left\lfloor \frac{n_s}{2} \right\rfloor;$$

and the step of mapping the second CSI-RS sequence to the time frequency location of the CSI-RS antenna port can comprise: mapping the second CSI-RS sequence $r_{n_s}(i')$ to the subcarrier k of the OFDM symbol l of the CSI-RS antenna port p via $a_{k,l}^{(p)} = w_{l''} \cdot r_{n_s}(i')$;

wherein, $a_{k,l}^{(p)}$ is the value of RE corresponding to the CSI-RS antenna port p, $w_{l''}$ is the orthogonal code factor, and $n_s$ is the time slot index.

The location index can be $i' = i + N_{RB}^{max,DL} - N_{RB}^{DL}$, $i = 0, 1, \ldots, 2N_{RB}^{DL} - 1$;

in the step of mapping the second CSI-RS sequence $r_{n_s}(i')$ to the subcarrier k of the OFDM symbol l of the CSI-RS antenna port p, there is:

$$k = k' + 12(i \bmod N_{RB}^{DL}) + \begin{cases} -0 & p \in \{15, 16\}, \text{ normal } CP \\ -6 & p \in \{17, 18\}, \text{ normal } CP \\ -1 & p \in \{19, 20\}, \text{ normal } CP \\ -7 & p \in \{21, 22\}, \text{ normal } CP \\ -0 & p \in \{15, 16\}, \text{ extended } CP \\ -3 & p \in \{17, 18\}, \text{ extended } CP \\ -6 & p \in \{19, 20\}, \text{ extended } CP \\ -9 & p \in \{21, 22\}, \text{ extended } CP \end{cases}$$

$$l = l' +$$

$$\begin{cases} l'' & \text{when using normal } CP, CSI\text{-}RS \text{ configuration index is } 0 \sim 19 \\ 2l'' & \text{when using normal } CP, CSI\text{-}RS \text{ configuration index is } 20 \sim 31 \\ l'' & \text{when using extended } CP, CSI\text{-}RS \text{ configuration index is } 0 \sim 27 \end{cases}$$

$$l'' = \lfloor i/N_{RB}^{DL} \rfloor \in \{0, 1\}, w_{l''} = \begin{cases} 1 & p \in \{15, 17, 19, 21\} \\ (-1)^{l''} & p \in \{16, 18, 20, 22\}, \end{cases}$$

wherein, k' is the frequency domain location of the first CSI-RS antenna port, and l' is the initial time domain location of the first CSI-RS antenna port.

In order to solve the above problems, the present invention further provides a device for generating and mapping CSI-RS sequence, comprising a generating unit and a mapping unit, wherein:

the generating unit is configured to: generate a pseudo-random sequence according to a pseudo-random sequence initial value, perform a QPSK modulation on the pseudo-random sequence, and obtain a first CSI-RS sequence according to maximum bandwidth of system;

the mapping unit is configured to: cut the first CSI-RS sequence according to actual bandwidth of the system, obtain a second CSI-RS sequence, and map the second CSI-RS sequence to a time frequency location of a CSI-RS antenna port.

The generating unit can be configured to generate the pseudo-random sequence and obtain the first CSI-RS sequence based on an OFDM symbol or a subframe;

the mapping unit can be configured to cut the first CSI-RS sequence to obtain the second CSI-RS sequence and map the second CSI-RS sequence to the time frequency location of the CSI-RS antenna port in the following way:

when the second CSI-RS sequence is mapped based on the OFDM symbol, the second CSI-RS sequences mapped on two OFDM symbols which are located in the same CDM group are produced from different first CSI-RS sequences;

when the second CSI-RS sequence is mapped based on the subframe, the second CSI-RS sequences mapped on the two OFDM symbols which are located in the same CDM group are produced from different parts of same first CSI-RS sequence.

In order to solve the above problems, the present invention further provides an evolved Node B (eNB), which comprises a device for generating and mapping a CSI-RS sequence, and the device comprises a generating unit and a mapping unit, wherein:

the generating unit is configured to: generate a pseudo-random sequence according to a pseudo-random sequence initial value, perform a QPSK modulation on the pseudo-random sequence, and obtain a first CSI-RS sequence according to maximum bandwidth of system;

the mapping unit is configured to: cut the first CSI-RS sequence according to actual bandwidth of the system to obtain a second CSI-RS sequence, and map the second CSI-RS sequence to a time frequency location of a CSI-RS antenna port.

In order to solve the above problems, the present invention provides an User Equipment (UE), which comprises a generating unit, a mapping acquiring unit, a receiving unit and a measuring unit, wherein:

the generating unit is configured to: generate a pseudo-random sequence according to a pseudo-random sequence initial value, perform a QPSK modulation on the pseudo-random sequence, and obtain a first CSI-RS sequence according to maximum bandwidth of system;

the mapping acquiring unit is configured to: cut the first CSI-RS sequence according to actual bandwidth of the system, and obtain a second CSI-RS sequence configured to be mapped to a time frequency location of a CSI-RS antenna port;

the receiving unit is configured to: receive a CSI-RS sequence sent by evolved Node B (eNB) on the time frequency location of the CSI-RS antenna port;

the measuring unit is configured to: calculate the CSI-RS sequence received by the receiving unit and the second CSI-RS sequence obtained by the mapping acquiring unit, and perform channel estimation and channel measurement.

With the present invention, the CSI-RS reference signal sequence can be respectively generated or obtained at the UE terminal and eNB terminal in accordance with the stated method for generating the reference sequence and method for mapping the reference sequence according to the known parameters, so that the calculated CSI-RS sequence can be utilized to measure the channel at the UE terminal.

PREFERRED EMBODIMENTS OF THE PRESENT INVENTION

The present invention will be described in detail in combination with the accompanying drawings and specific examples below.

Figure 1:
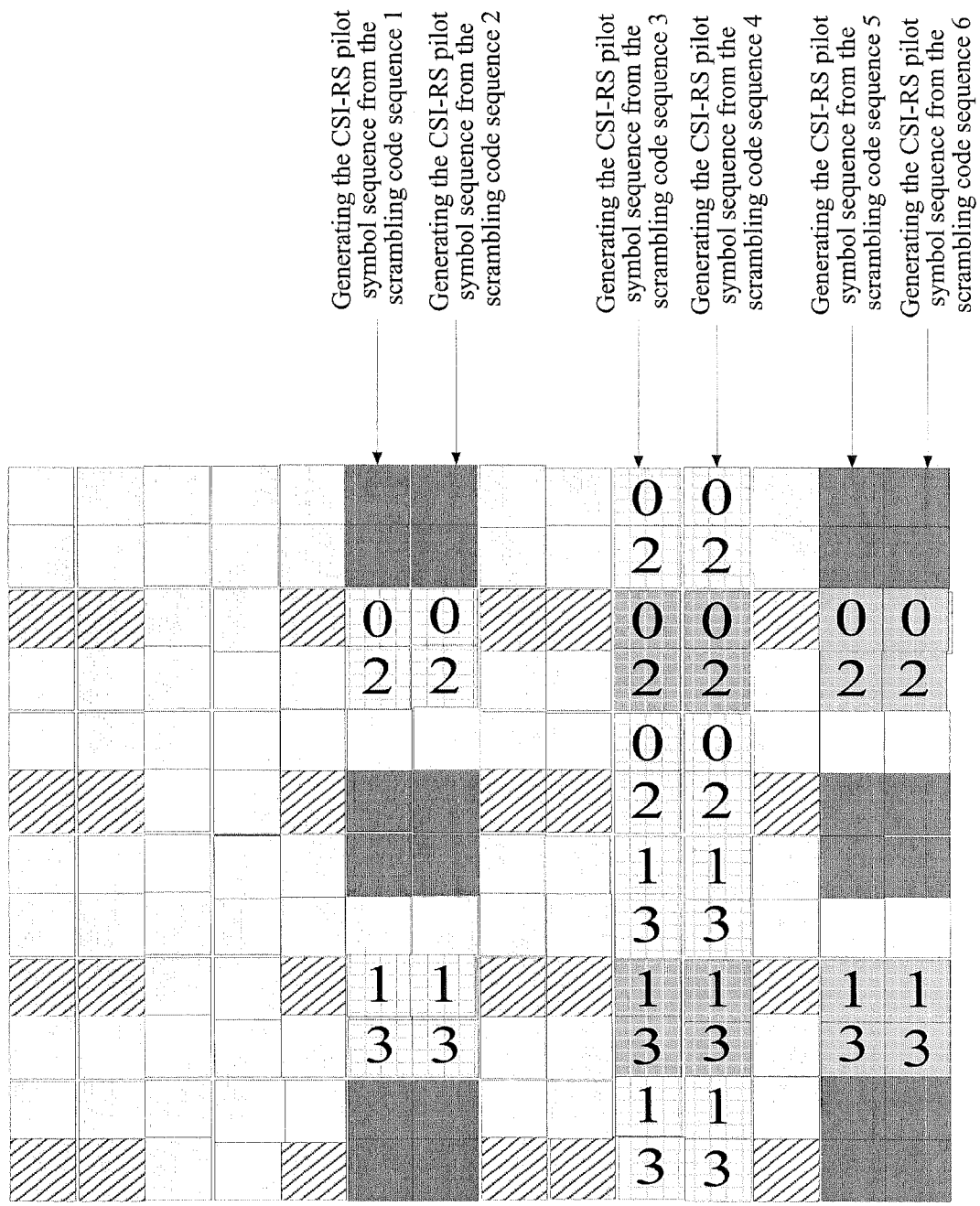
FIG. 1 illustrates a sequence distribution mode when choosing the CSI-RS sequence mode FDD Normal CP based on the OFDM symbol.
Figure 2:
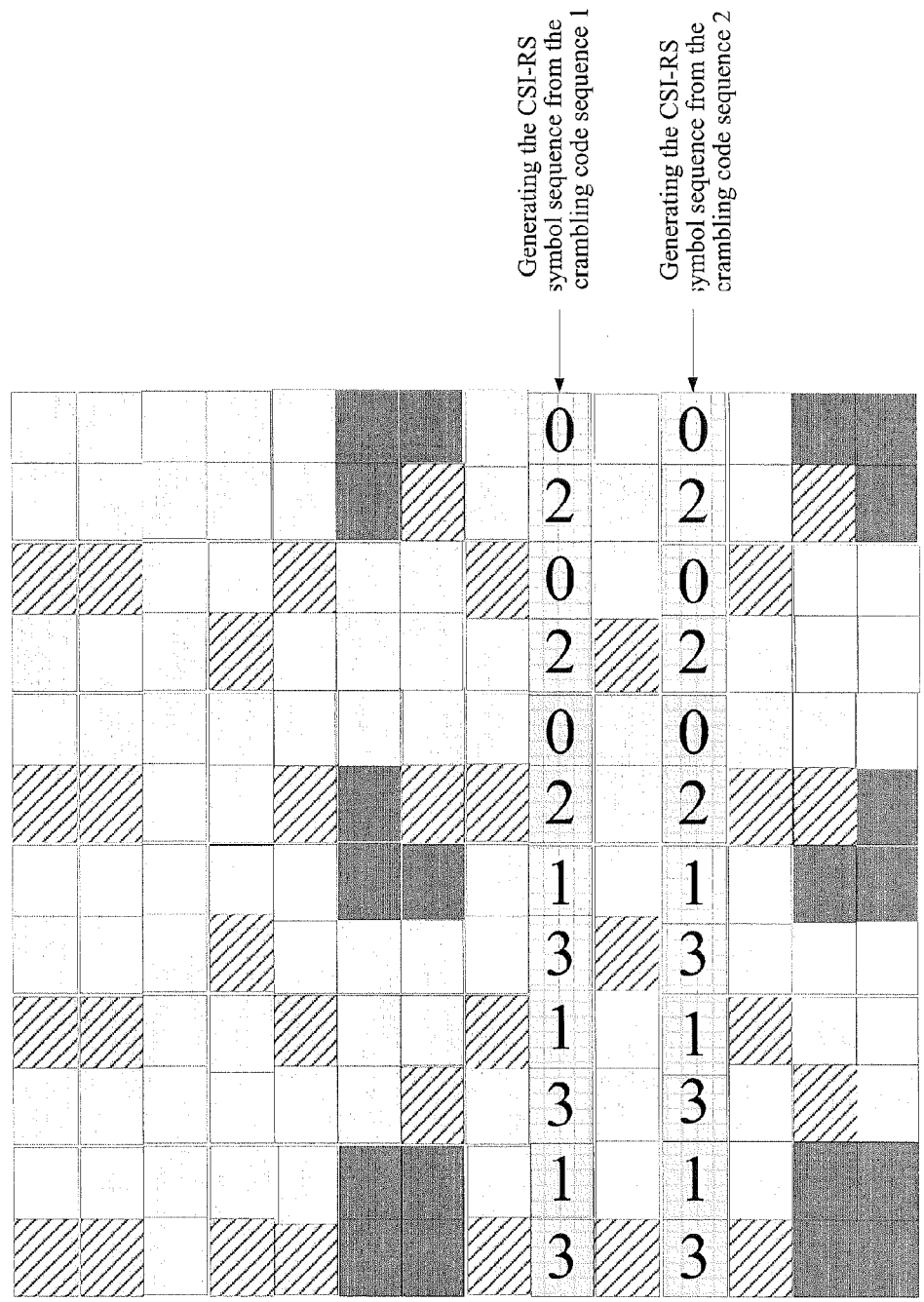
FIG. 2 illustrates a sequence distribution mode when choosing the CSI-RS sequence mode TDD Only Normal CP based on the OFDM symbol.
Figure 3:
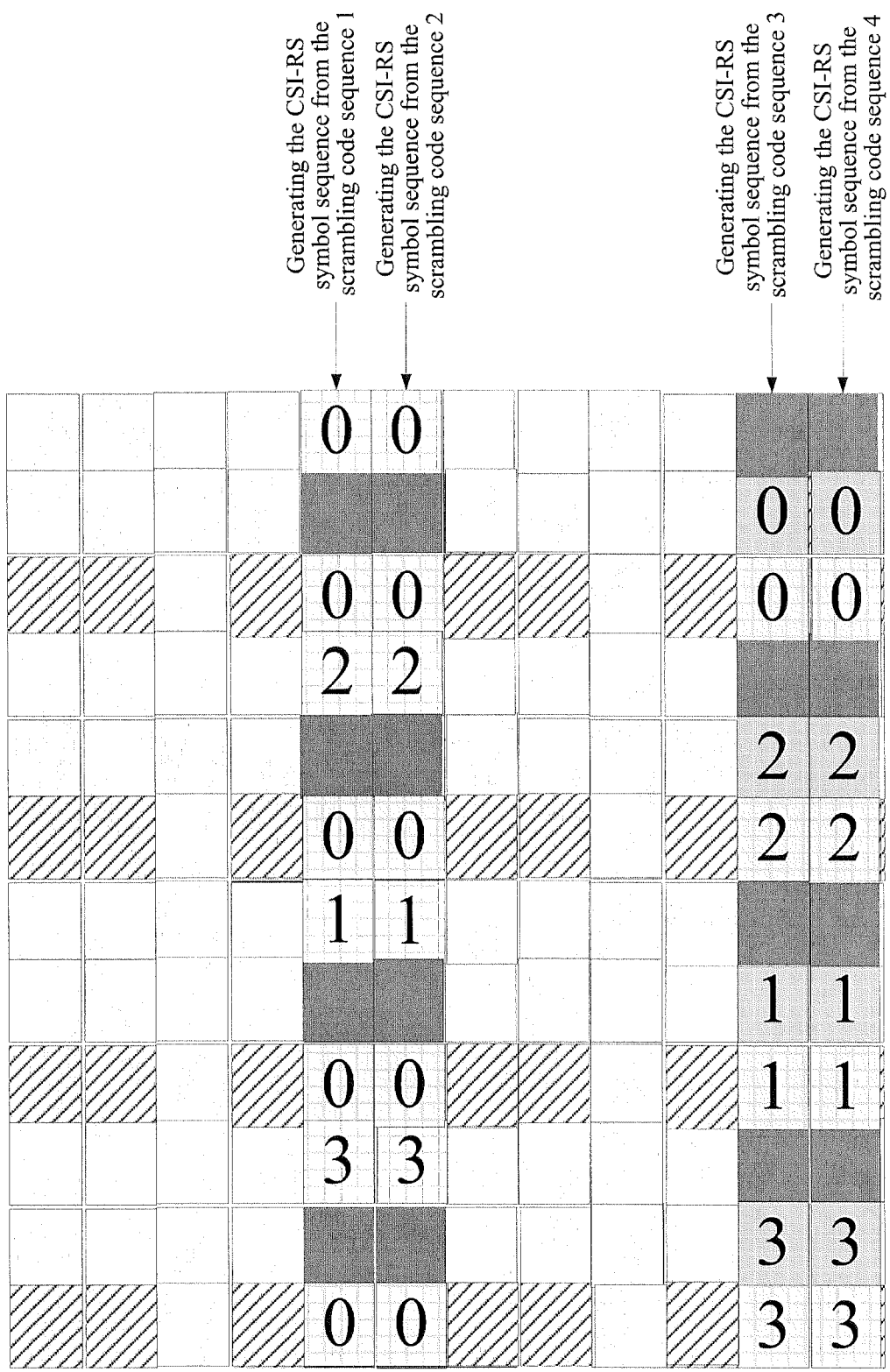
FIG. 3 illustrates a sequence distribution mode when choosing the CSI-RS sequence mode FDD Extended CP based on the OFDM symbol.
Figure 4:
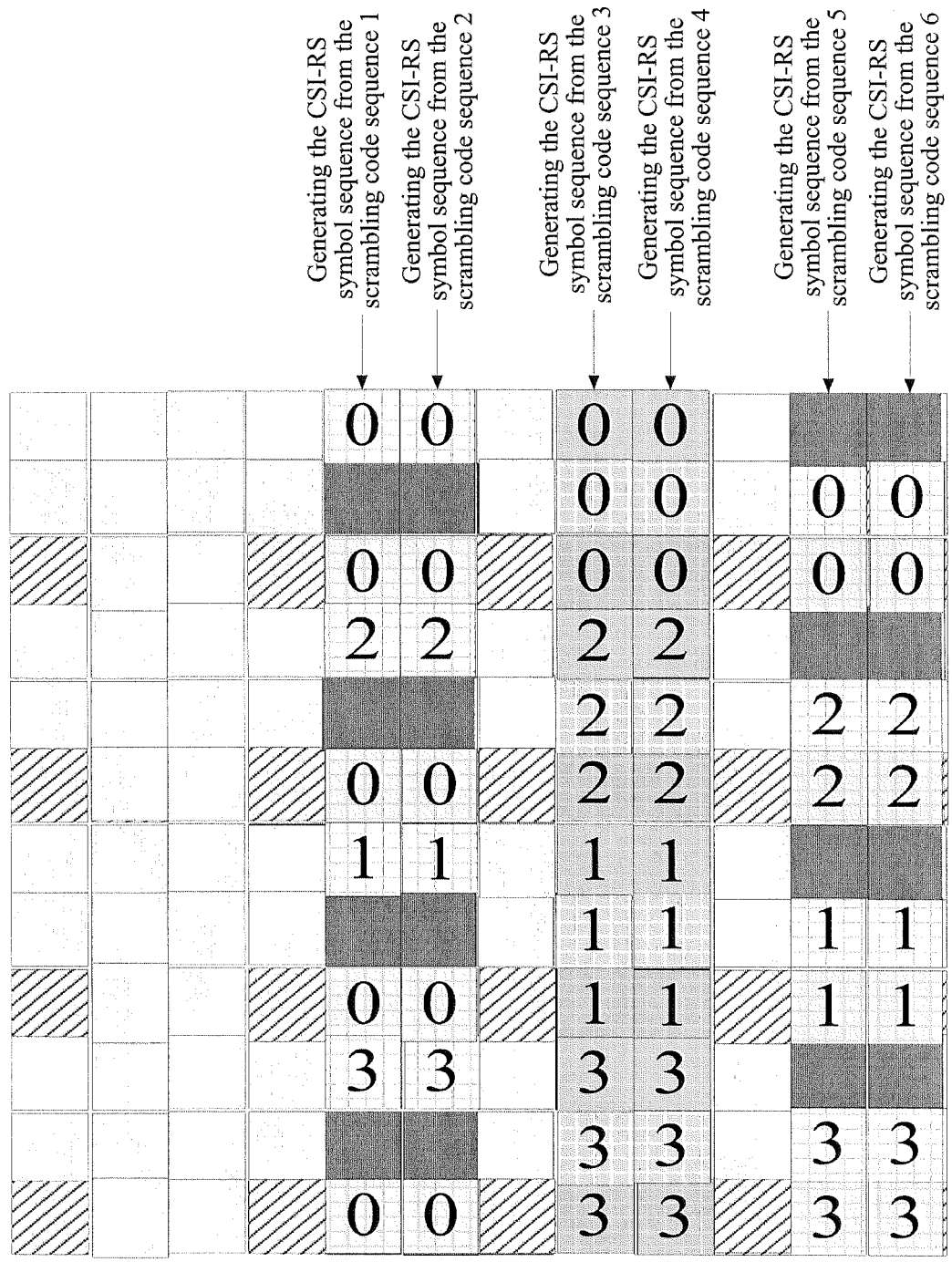
FIG. 4 illustrates a sequence distribution mode when choosing the CSI-RS sequence mode TDD Only Extended CP based on the OFDM symbol.
Figure 5:
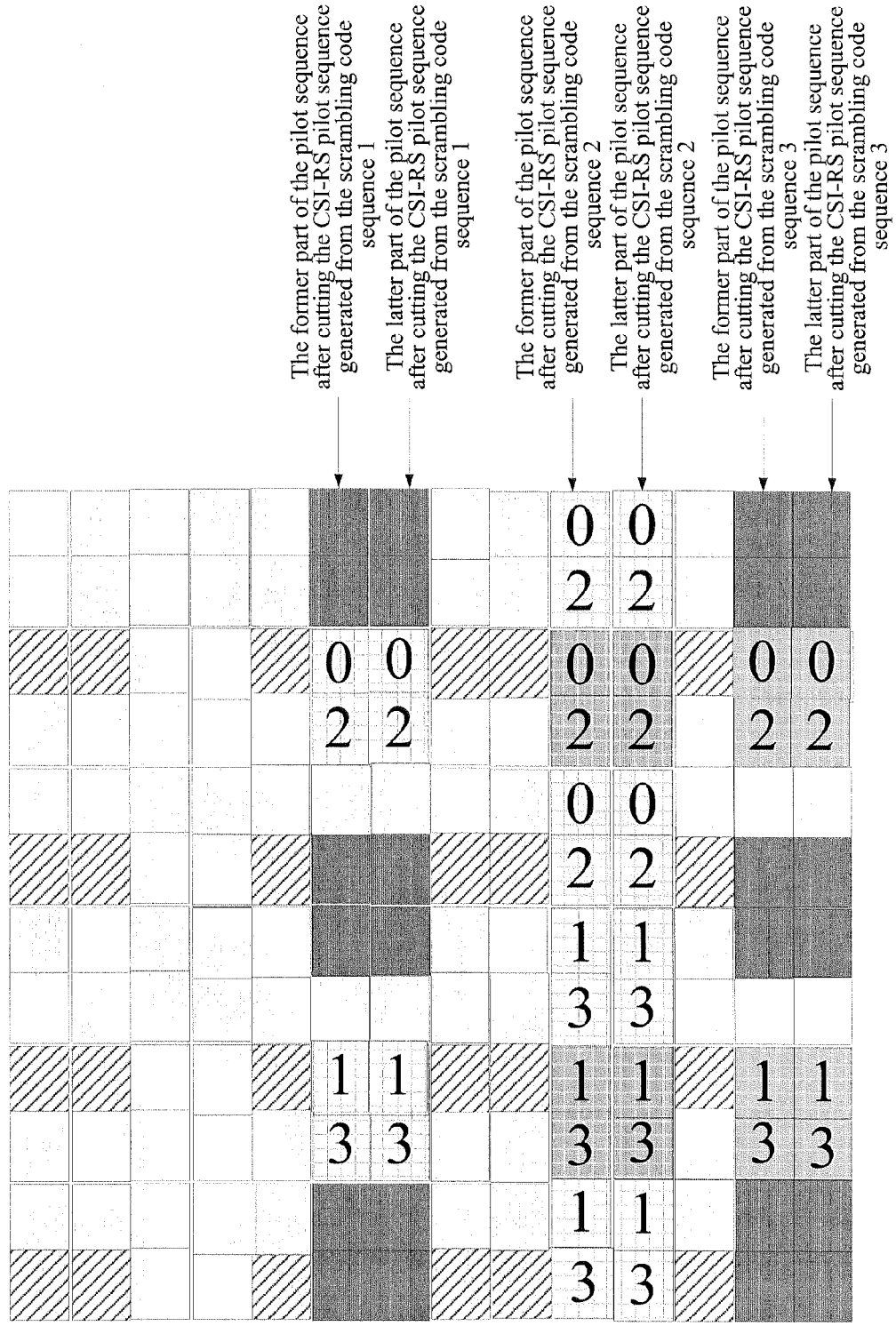
FIG. 5 illustrates a sequence distribution mode when choosing the CSI-RS sequence mode FDD Normal CP based on the subframe.
Figure 6:
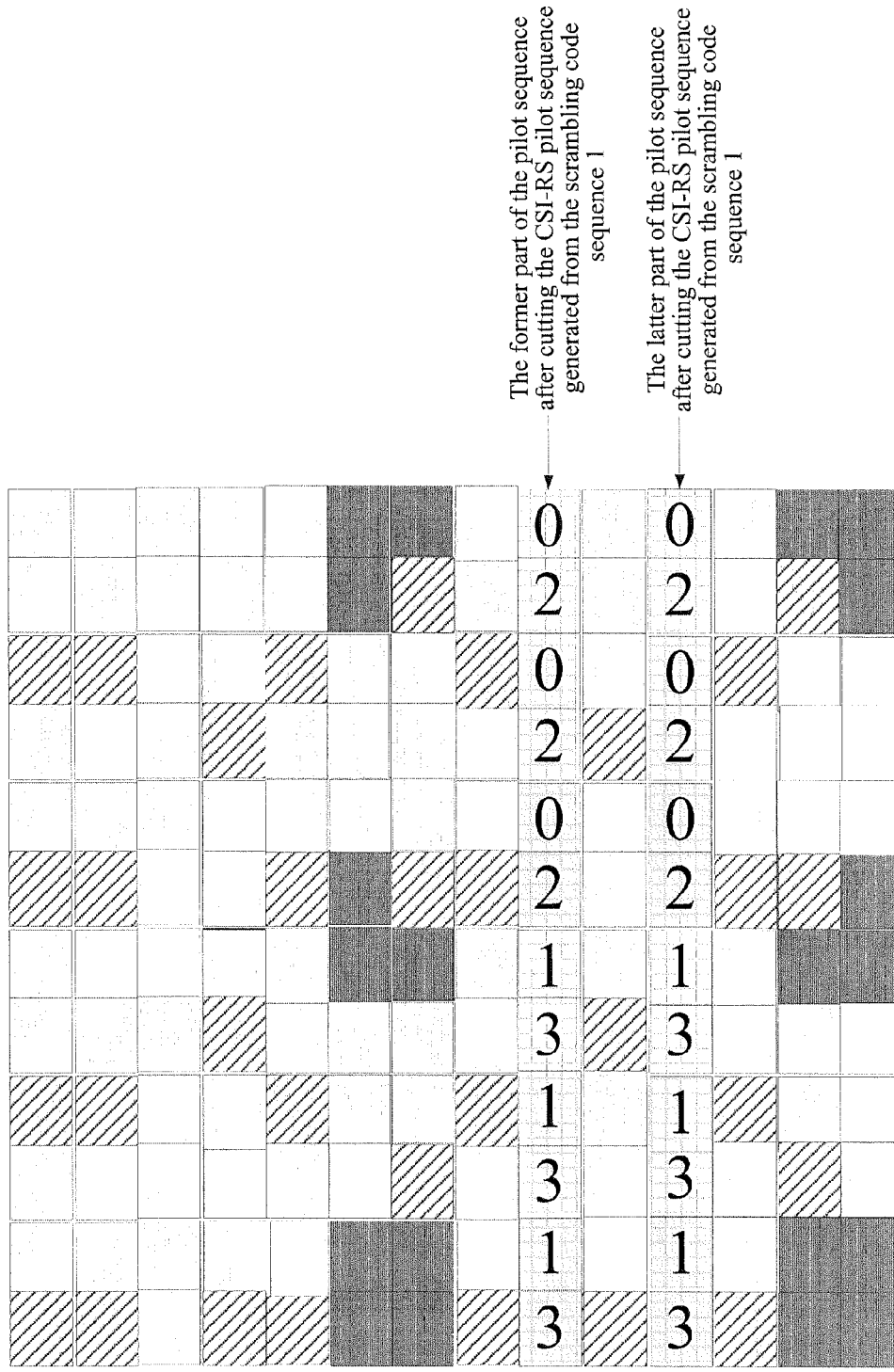
FIG. 6 illustrates a sequence distribution mode when choosing the CSI-RS sequence mode TDD Only Normal CP based on subframe.
Figure 7:
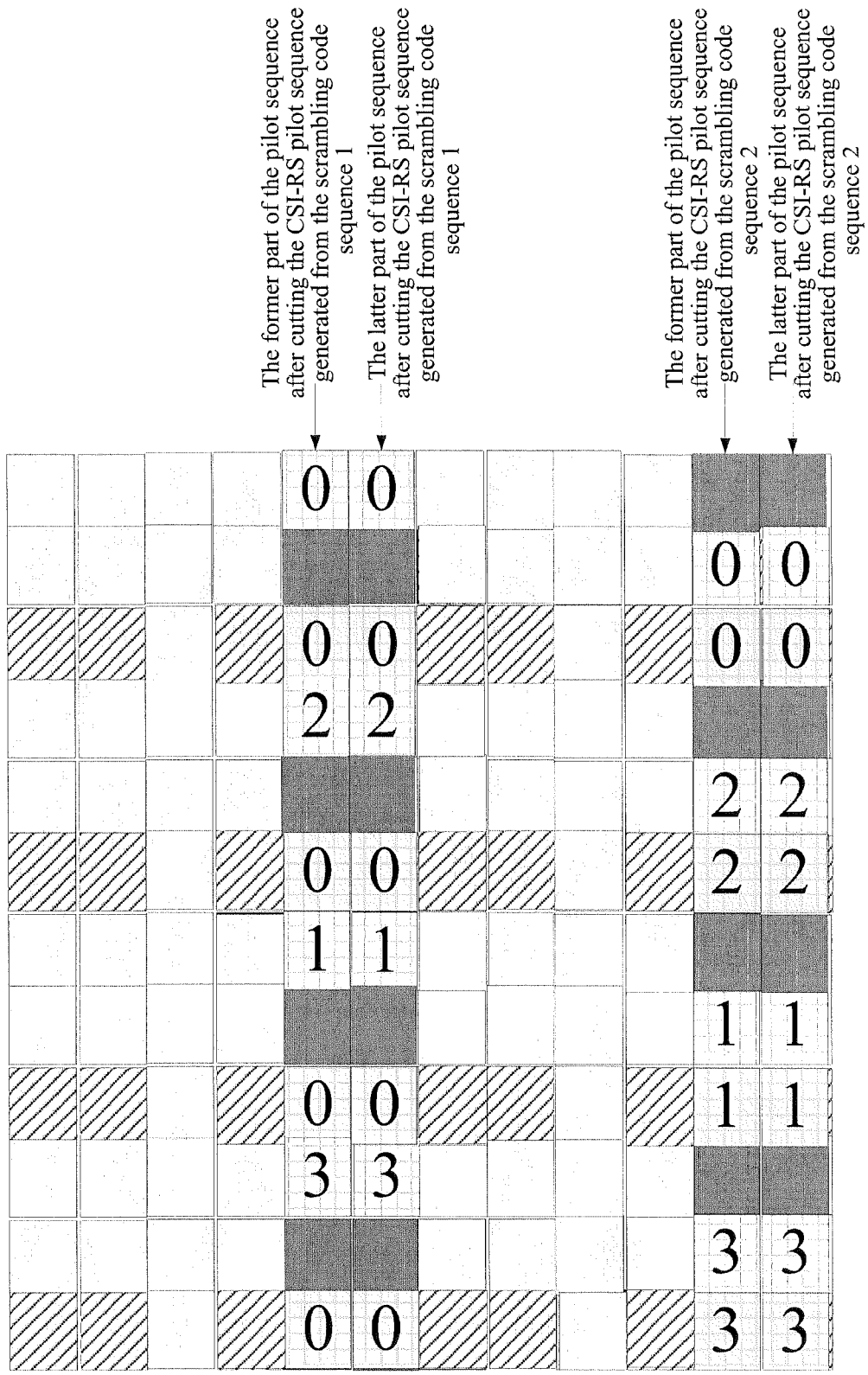
FIG. 7 illustrates a sequence distribution mode when choosing the CSI-RS sequence mode FDD Extended CP based on the subframe.
Figure 8:
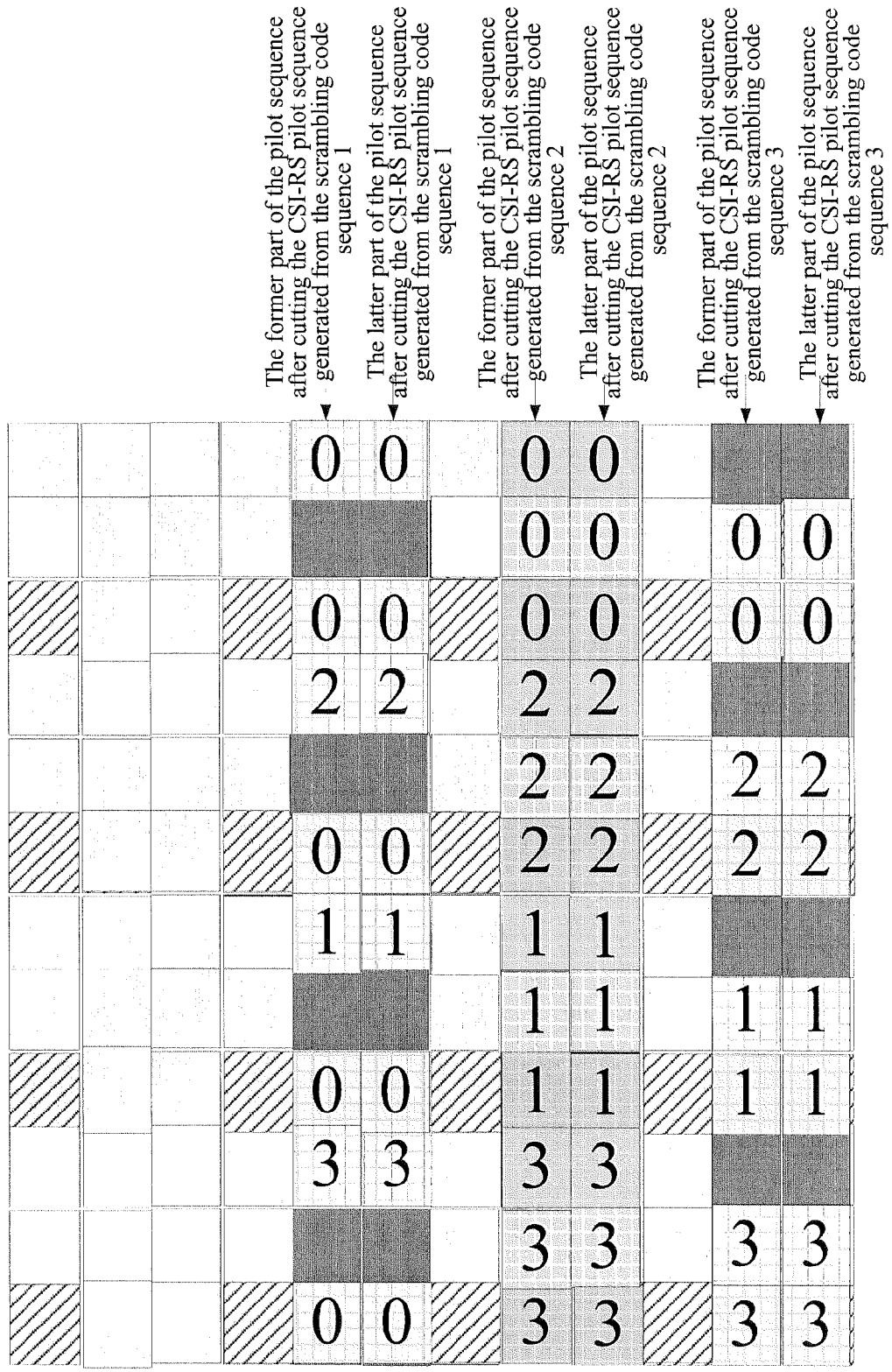
FIG. 8 illustrates a sequence distribution mode when choosing the CSI-RS sequence mode TDD Only Extended CP based on subframe.
Figure 9:
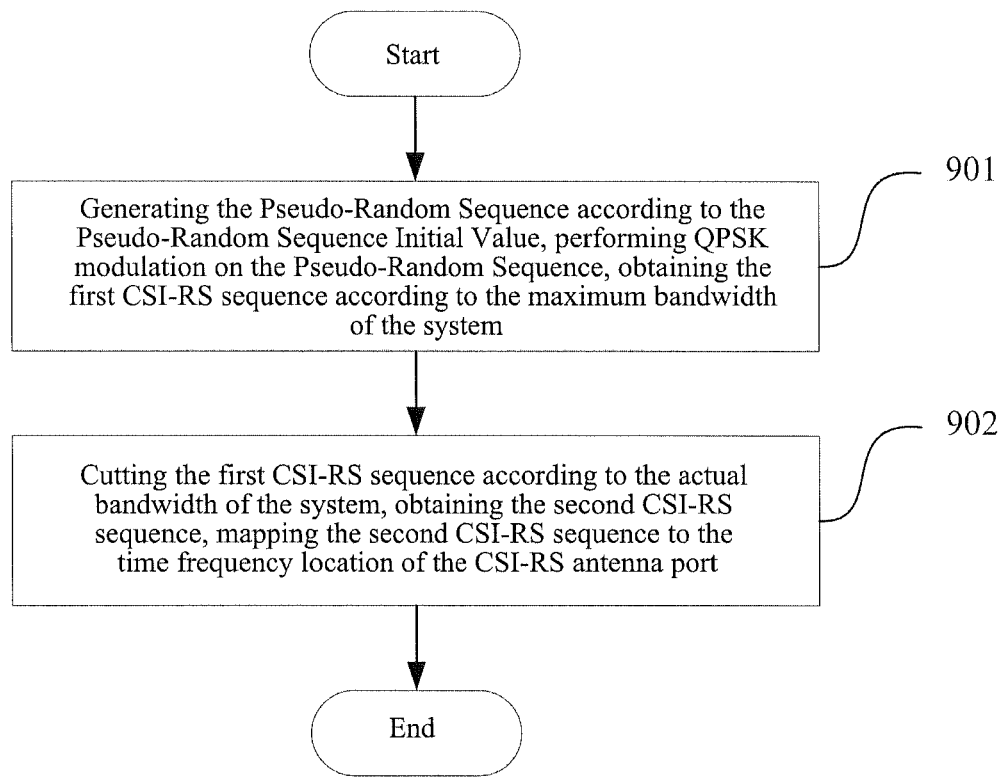
FIG. 9 is a flow chart of the method for generating and mapping the CSI-RS sequence according to the examples of the present invention.

As shown in FIG. 9, it is a flow chart of the method for generating and mapping the CSI-RS sequence according to the examples of the present invention, and the following steps are comprised.

In step 901, a pseudo-random sequence is generated according to a pseudo-random sequence initial value, and a Quadrature Phase-Shift Keying (QPSK) modulation is performed on the pseudo-random sequence, the first CSI-RS sequence is obtained according to the maximum bandwidth of system, wherein the maximum bandwidth of system is 110 RB.

In step 902, the first CSI-RS sequence is cut according to the actual bandwidth of the system, and a second CSI-RS sequence is obtained, and the second CSI-RS sequence is mapped to a time frequency location of a CSI-RS antenna port.

Specifically, the eNB sends the second CSI-RS sequence to UE through the above steps;

the UE also acquires the second CSI-RS sequence of each CSI-RS antenna port through the above steps, and it performs relevant calculations on the second CSI-RS sequence and the CSI-RS sequence received from the eNB and performs channel estimation and channel measurement.

In the method, the CSI-RS sequence can be generated and mapped based on an OFDM symbol or a subframe:

when the CSI-RS sequence is generated and mapped based on the OFDM symbol, the second CSI-RS sequences mapped on two OFDM symbols which are located in the same CDM group are produced from different first CSI-RS sequences;

when the CSI-RS sequence is generated and mapped based on the subframe, the second CSI-RS sequences mapped on the two OFDM symbols which are located in the same CDM group are produced from different parts of the same first CSI-RS sequence.

The examples based on the OFDM symbol and the subframe are respectively described in detail below.

Example one: the CSI-RS sequence is generated and mapped based on the OFDM symbol.

In the example, the CSI-RS sequence is generated and mapped according to the following steps, and the mapped CSI-RS sequence is shown in FIG. 1~FIG. 4.

In step 1, the pseudo-random sequence initial value $c_{init}$ is generated.

In step 2, the pseudo-random sequence c(n) is generated.

In step 3, the QPSK modulation is performed on the pseudo-random sequence, and the first CSI-RS sequence r(m) is obtained according to the maximum bandwidth $N_{RB}^{max,DL}$ of the system.

In step 4, a location index i' is calculated according to the actual bandwidth $N_{RB}^{DL}$ of the system, and the first CSI-RS sequence r(m) is cut in accordance with the location index i', and the second CSI-RS sequence $r_{l,n_s}(i')$ is obtained.

In step 5, the second CSI-RS sequence $r_{l,n_s}(i')$ is mapped to the subcarrier k of the OFDM symbol l of the CSI-RS antenna port p, $a_{k,l}^{(p)} = w_{l''} \cdot r_{l,n_s}(i')$, wherein $a_{k,l}^{(p)}$ is a value of RE corresponding to the CSI-RS antenna port p, and $w_{l''}$ is an orthogonal code factor.

Wherein, the Pseudo-Random Sequence is also called a scrambling code or a scrambling code sequence, and the pseudo-random sequence initial value is also called a scrambling code initial value.

In the step 1, in order to fully randomize the interference between multiple cells, in one application example, the calculation of the scrambling code initial value adopts any one of the following formulas:

$$c_{init} = 2^9 \cdot (7(n_s+1)+l+1) \cdot (2 \cdot N_{ID}^{cell}+1) + N_{ID}^{cell};$$

$$c_{init} = 2^9 \cdot (7(n_s+1)+l+1) \cdot (2 \cdot N_{ID}^{cell}+1);$$

$$c_{init} = (7(n_s+1)+l+1) \cdot (2 \cdot N_{ID}^{cell}+1);$$

wherein, $n_s$ is a time slot index in one radio frame, l is an OFDM index in one time slot, and $N_{ID}^{cell}$ is a cell ID (a physical ID of the cell).

If the CSI-RS is considered to be used to verify the length of CP, the parameter required in calculation of such initial value can be the time slot index, the OFDM symbol index in one time slot, the cell ID and a CP length factor. In one application example, the calculation of the scrambling code initial value adopts any one of the following formulas:

$$c_{init} = 2^{10} \cdot (7 \cdot (n_s+1)+l+1) \cdot (2 \cdot N_{ID}^{cell}+1) + 2 \cdot N_{ID}^{cell} + N_{CP}$$

$$c_{init} = 2^{10} \cdot (7 \cdot (n_s+1)+l+1) \cdot (2 \cdot N_{ID}^{cell}+1) + N_{CP}$$

$$c_{init} = 2 \cdot (7 \cdot (n_s+1)+l+1) \cdot (2 \cdot N_{ID}^{cell}+1) + N_{CP}$$

wherein, $n_s$ is the time slot index in one radio frame, l is the OFDM index in one time slot, $N_{ID}^{cell}$ is the cell ID, and $N_{CP}$ is the CP length factor. When the subframe is a normal CP, $N_{CP}=1$, otherwise $N_{CP}=0$.

Furthermore, in order to make the interference of CSI-RS antenna ports located in two adjacent subcarriers of the same cell randomized, the parameter required in calculation of such initial value can be the time slot index, the OFDM symbol index in one time slot, the cell ID and the antenna port index related parameter. In one application example, the calculation of the scrambling code initial value adopts any one of the following formulas:

$$c_{init} = 2^9 \cdot (7 \cdot (n_s+1)+l+1) \cdot (2 \cdot N_{ID}^{cell}+1) \cdot (2 \cdot \lfloor ANTPORT/4 \rfloor + 1) + N_{ID}^{cell}$$

$$c_{init} = 2^9 \cdot (7 \cdot (n_s+1)+l+1) \cdot (2 \cdot N_{ID}^{cell}+1) \cdot (2 \cdot \lfloor ANTPORT/2 \rfloor + 1) + N_{ID}^{cell}$$

$$c_{init} = (7 \cdot (n_s+1)+l+1) \cdot (2 \cdot N_{ID}^{cell}+1) \cdot (2 \cdot \lfloor ANTPORT/4 \rfloor + 1)$$

$$c_{init} = (7 \cdot (n_s+1)+l+1) \cdot (2 \cdot N_{ID}^{cell}+1) \cdot (2 \cdot \lfloor ANTPORT/2 \rfloor + 1)$$

$$c_{init} = 4 \cdot (7 \cdot (n_s+1)+l+1) \cdot (2 \cdot N_{ID}^{cell}+1) + \lfloor ANTPORT/2 \rfloor$$

$$c_{init} = 2 \cdot (7 \cdot (n_s+1)+l+1) \cdot (2 \cdot N_{ID}^{cell}+1) + \lfloor ANTPORT/4 \rfloor$$

$$c_{init} = 2^9 \cdot (7 \cdot (n_s+1)+l+1) \cdot (2 \cdot N_{ID}^{cell}+1) + \lfloor ANTPORT/2 \rfloor$$

$$c_{init} = 2^9 \cdot (7 \cdot (n_s+1)+l+1) \cdot (2 \cdot N_{ID}^{cell}+1) + \lfloor ANTPORT/4 \rfloor$$

$$c_{init} = 2^{10} \cdot (7 \cdot (n_s+1)+l+1) \cdot (2 \cdot N_{ID}^{cell}+1) + \lfloor ANTPORT/2 \rfloor$$

$$c_{init} = 2^{10} \cdot (7 \cdot (n_s+1)+l+1) \cdot (2 \cdot N_{ID}^{cell}+1) + \lfloor ANTPORT/4 \rfloor$$

$$c_{init} = 2^{10} \cdot (7 \cdot (n_s+1)+l+1) \cdot (2 \cdot N_{ID}^{cell}+1) + \lfloor ANTPORT/2 \rfloor$$

$$c_{init} = 2^{10} \cdot (7 \cdot (n_s+1)+l+1) \cdot (2 \cdot N_{ID}^{cell}+1) + 2 \cdot N_{ID}^{cell} + \lfloor ANTPORT/4 \rfloor$$

$$c_{init} = 2^{11} \cdot (7 \cdot (n_s+1)+l+1) \cdot (2 \cdot N_{ID}^{cell}+1) + 4 \cdot N_{ID}^{cell} + \lfloor ANTPORT/2 \rfloor$$

wherein, $n_s$ is the time slot index in one radio frame, l is the OFDM index in one time slot, and $N_{ID}^{cell}$ is the cell ID; ANTPORT is the CSI-RS antenna port index related parameter and corresponds to the CSI-RS antenna port {15, 16, 17, 18, 19, 20, 21, 22}, and the value of ANTPORT can be respectively {0, 1, 2, 3, 4, 5, 6, 7}; or, the value of ANTPORT can be respectively {15, 16, 17, 18, 19, 20, 21, 22}, or, the value of ANTPORT is respectively {15-2, 16-2, 17-2, 18-2, 19-2, 20-2, 21-2, 22-2}, or, the value of ANTPORT can be generated in accordance with other parameters related to the CSI-RS antenna port.

Furthermore, in order to make the interference of CSI-RS antenna ports located in two adjacent subcarriers of the same cell randomized and consider that the CP length is verified, the parameter required in calculation of such initial value can be the time slot index, the OFDM symbol index in one time slot, the cell ID, the antenna port index related parameter and the CP length factor. In one application example, the calculation of the scrambling code initial value adopts any one of the following formulas:

$$c_{init} = 2^{10} \cdot (7 \cdot (n_s+1)+l+1) \cdot (2 \cdot N_{ID}^{cell}+1) \cdot (2 \cdot \lfloor ANTPORT/4 \rfloor + 1) + 2 N_{ID}^{cell} + N_{CP}$$

$$c_{init} = 2^{10} \cdot (7 \cdot (n_s+1)+l+1) \cdot (2 \cdot N_{ID}^{cell}+1) \cdot (2 \cdot \lfloor ANTPORT/2 \rfloor + 1) + 2 N_{ID}^{cell} + N_{CP}$$

$$c_{init} = 2 \cdot (7 \cdot (n_s+1)+l+1) \cdot (2 \cdot N_{ID}^{cell}+1) \cdot (2 \cdot \lfloor ANTPORT/4 \rfloor + 1) + N_{CP}$$

$$c_{init}=8\cdot(7\cdot(n_s+1)+l+1)\cdot(2\cdot N_{ID}^{cell}+1)+2\cdot\lfloor ANTPORT/2\rfloor+N_{CP}$$

$$c_{init}=4\cdot(7\cdot(n_s+1)+l+1)\cdot(2\cdot N_{ID}^{cell}+1)+2\cdot\lfloor ANTPORT/4\rfloor+N_{CP}$$

$$c_{init}=2^9\cdot(7\cdot(n_s+1)+l+1)\cdot(2\cdot N_{ID}^{cell}+1)+2\cdot\lfloor ANTPORT/2\rfloor+N_{CP}$$

$$c_{init}=2^9\cdot(7\cdot(n_s+1)+l+1)\cdot(2\cdot N_{ID}^{cell}+1)+2\cdot\lfloor ANTPORT/4\rfloor+N_{CP}$$

$$c_{init}=2^{10}\cdot(7\cdot(n_s+1)+l+1)\cdot(2\cdot N_{ID}^{cell}+1)+2\cdot\lfloor ANTPORT/4\rfloor+N_{CP}$$

$$c_{init}=2^{10}\cdot(7\cdot(n_s+1)+l+1)\cdot(2\cdot N_{ID}^{cell}+1)+2\cdot\lfloor ANTPORT/2\rfloor+N_{CP}$$

wherein: $n_s$ is the time slot index in one radio frame, $l$ is the OFDM index in one time slot, and $N_{ID}^{cell}$ is the cell ID. When a subframe is a Normal CP subframe, $N_{CP}=1$, when the subframe is an Extended CP subframe, $N_{BP}=0$, and ANTPORT is the CSI-RS antenna port index related parameter.

Furthermore, considering that the number of the CSI-RS antenna ports of the cell can be blindly detected, the parameter required in calculation of such initial value can be the time slot index, the OFDM symbol index in one time slot, the cell ID, and the CSI-RS antenna port number related parameter. In one application example, the calculation of the scrambling code initial value adopts any one of the following formulas:

$$c_{init}=2^9\cdot(7\cdot(n_s+1)+l+1)\cdot(2\cdot N_{ID}^{cell}+1)\cdot 2\cdot ANTPORTNUM+1)+N_{ID}^{cell}$$

$$c_{init}=2^9\cdot(7\cdot(n_s+1)+l+1)\cdot(2\cdot N_{ID}^{cell}+1)\cdot 2\cdot ANTPORTNUM+1)$$

$$c_{init}=2^{11}\cdot(7\cdot(n_s+1)+l+1)\cdot(2\cdot N_{ID}^{cell}+1)+4N_{ID}^{cell}+ANTPORTNUM$$

$$c_{init}=2^9\cdot(7\cdot(n_s+1)+l+1)\cdot(2\cdot N_{ID}^{cell}+1)+ANTPORTNUM$$

$$c_{init}=4\cdot(7\cdot(n_s+1)+l+1)\cdot(2\cdot N_{ID}^{cell}+1)+ANTPORTNUM$$

$$c_{init}=2^9\cdot(7\cdot(n_s+1)+l+1)\cdot(2\cdot N_{ID}^{cell}+1)\cdot(2\cdot ANTPORTNUM+1)+N_{ID}^{cell}$$

$$c_{init}=2^{11}\cdot(7\cdot(n_s+1)+l+1)\cdot(2\cdot N_{ID}^{cell}+1)+4N_{ID}^{cell}+ANTPORTNUM$$

wherein, $n_s$ is the time slot index in one radio frame, $l$ is the OFDM index in one time slot, $N_{ID}^{cell}$ is the cell ID, ANTPORT is the CSI-RS antenna port index related parameter and can correspond to the CSI-RS antenna port {15, 16, 17, 18, 19, 20, 21, 22}, the value of ANTPORT is respectively {0, 1, 2, 3, 4, 5, 6, 7}; or, the value of ANTPORT is respectively {15, 16, 17, 18, 19, 20, 21, 22}, or, the value of ANTPORT is respectively {15-2, 16-2, 17-2, 18-2, 19-2, 20-2, 21-2, 22-2}; or, the value of ANTPORT can be generated in accordance with other parameters related to the CSI-RS antenna port; and ANTPORTNUM is the CSI-RS antenna port number related parameter of one cell. For example: when the number of CSI-RS antenna ports is 1, the value of ANTPORTNUM is 2, when the number of CSI-RS antenna ports is 2, the value of ANTPORTNUM is 3, when the number of CSI-RS antenna ports is 4, the value of ANTPORTNUM is 4, when the number of CSI-RS antenna ports is 5, the value of ANTPORTNUM is 3, or when the number of CSI-RS antenna ports is 2, the value of ANTPORTNUM is 0, when the number of CSI-RS antenna ports is 4, the value of ANTPORTNUM is 1, when the number of CSI-RS antenna ports is 8, the value of ANTPORTNUM is 2, the value of ANTPORTNUM is reserved for 3, or ANTPORTNUM is other values related to the number of the CSI-RS antenna ports of one cell.

Furthermore, considering that the number of the CSI-RS antenna ports of the cell can be blindly detected and the CP length can be verified, the parameter required in calculation of such initial value can be the time slot index, the OFDM symbol index in one time slot, the cell ID, the CSI-RS antenna port number related parameter and the CP length factor. In one application example, the calculation of the scrambling code initial value adopts any one of the following formulas:

$$c_{init}=2^{12}\cdot(7\cdot(n_s+1)+l+1)\cdot(2\cdot N_{ID}^{cell}+1)+8N_{ID}^{cell}+4N_{CP}+ANTPORTNUM$$

$$c_{init}=2^9\cdot(7\cdot(n_s+1)+l+1)\cdot(2\cdot N_{ID}^{cell}+1)+4N_{CP}+ANTPORTNUM$$

$$c_{init}=8\cdot(7\cdot(n_s+1)+l+1)\cdot(2\cdot N_{ID}^{cell}+1)+4N_{CP}+ANTPORTNUM$$

$$c_{init}=2^{12}\cdot(7\cdot(n_s+1)+l+1)\cdot(2\cdot N_{ID}^{cell}+1)+8N_{ID}^{cell}+2ANTPORTNUM+N_{CP}$$

$$c_{init}=2^9\cdot(7\cdot(n_s+1)+l+1)\cdot(2\cdot N_{ID}^{cell}+1)+2ANTPORTNUM+N_{CP}$$

$$c_{init}=8\cdot(7\cdot(n_s+1)+l+1)\cdot(2\cdot N_{ID}^{cell}+1)+2ANTPORTNUM+N_{CP}$$

wherein, $n_s$ is the time slot index in one radio frame, $l$ is the OFDM index in one time slot, $N_{ID}^{cell}$ is the cell ID, when the subframe is the Normal CP, $N_{CP}=1$, otherwise $N_{CP}=0$, ANTPORT is the CSI-RS antenna port index related parameter, and ANTPORTNUM is the CSI-RS antenna port number related parameter of the cell. For example: when the number of CSI-RS antenna ports is 1, the value of ANTPORTNUM is 2, when the number of CSI-RS antenna ports is 2, the value of ANTPORTNUM is 3, when the number of CSI-RS antenna ports is 4, the value of ANTPORTNUM is 4, when the number of CSI-RS antenna ports is 8, the value of ANTPORTNUM is 5, or when the number of CSI-RS antenna ports is 2, the value of ANTPORTNUM is 0, when the number of CSI-RS antenna ports is 4, the value of ANTPORTNUM is 1, when the number of CSI-RS antenna ports is 8, the value of ANTPORTNUM is 2, the value of ANTPORTNUM is reserved for 3, or ANTPORTNUM is other values related to the number of the CSI-RS antenna ports of one cell.

Furthermore, in order to make the interference of CSI-RS antenna ports located in two adjacent subcarriers of the same cell randomized and consider that the numbers of the CSI-RS antenna ports of the cell can be blindly detected, the parameter required in calculation of such initial value can be the time slot index, the OFDM symbol index in one time slot, the cell ID, the CSI-RS antenna port number related parameter, the CSI-RS antenna port index related parameter and the CP length factor. In one application example, the calculation of the scrambling code initial value adopts any one of the following formulas:

$$c_{init}=2^{11}\cdot(7\cdot(n_s+1)+l+1)\cdot(2\cdot N_{ID}^{cell}+1)(2\cdot\lfloor ANTPORT/4\rfloor+1)+4N_{ID}^{cell}+ANTPORTNUM$$

$$c_{init}=2^9\cdot(7\cdot(n_s+1)+l+1)\cdot(2\cdot N_{ID}^{cell}+1)(2\cdot\lfloor ANTPORT/4\rfloor+1)+ANTPORTNUM$$

$$c_{init}=4\cdot(7\cdot(n_s+1)+l+1)\cdot(2\cdot N_{ID}^{cell}+1)(2\cdot\lfloor ANTPORT/4\rfloor+1)+ANTPORTNUM$$

$$c_{init}=2^{10}\cdot(7\cdot(n_s+1)+l+1)\cdot(2\cdot N_{ID}^{cell}+1)+8\cdot\lfloor ANTPORT/4\rfloor+ANTPORTNUM$$

$$c_{init}=2^{10}\cdot(7\cdot(n_s+1)+l+1)\cdot(2\cdot N_{ID}^{cell}+1)+8\cdot\lfloor ANTPORT/2\rfloor+ANTPORTNUM$$

wherein: $n_s$ is the time slot index in one radio frame, l is the OFDM index in one time slot, $N_{ID}^{cell}$ is the physical ID of the cell, ANTPORT is the CSI-RS antenna port index related parameter, and ANTPORTNUM is the CSI-RS antenna port number related parameter of the cell. For example, when the number of the CSI-RS antenna ports is 1, the value of ANTPORTNUM is 2, when the number of the CSI-RS antenna ports is 2, the value of ANTPORTNUM is 3, when the number of the CSI-RS antenna ports is 4, the value of ANTPORTNUM is 4, when the number of the CSI-RS antenna ports is 8, the value of ANTPORTNUM is 5, or when the number of the CSI-RS antenna ports is 2, the value of ANTPORTNUM is 0, when the number of the CSI-RS antenna ports is 4, the value of ANTPORTNUM is 1, when the number of the CSI-RS antenna ports is 8, the value of ANTPORTNUM is 2, the value of ANTPORTNUM is reserved for 3, or, ANTPORTNUM is other values related to the number of the CSI-RS antenna ports of one cell.

Furthermore, in order to make the interference of CSI-RS antenna ports located in two adjacent subcarriers of the same cell randomized and consider that the numbers of the CSI-RS antenna ports of the cell can be blindly detected and also the CP length is required to be detected, the parameter required in calculation of such initial value can be the time slot index, the OFDM symbol index in one time slot, the cell ID, the CSI-RS antenna port number related parameter, the CSI-RS antenna port index related parameter and the CP length factor. In one application example, the calculation of the scrambling code initial value adopts any one of the following formulas:

$$c_{init}=2^9\cdot(7\cdot(n_s+1)+l+1)\cdot(2\cdot N_{ID}^{cell}+1)(2\cdot\lfloor ANTPORT/4\rfloor+1)+8N_{ID}^{cell}+4N_{CP}+ANTPORTNUM$$

$$c_{init}=2^9\cdot(7\cdot(n_s+1)+l+1)\cdot(2\cdot N_{ID}^{cell}+1)(2\cdot\lfloor ANTPORT/4\rfloor+1)+4N_{CP}+ANTPORTNUM$$

$$c_{init}=2^{12}\cdot(7\cdot(n_s+1)+l+1)\cdot(2\cdot N_{ID}^{cell}+1)(2\cdot\lfloor ANTPORT/4\rfloor+1)+8N_{ID}^{cell}+2ANTPORTNUM+N_{CP}$$

$$c_{init}=2^9\cdot(7\cdot(n_s+1)+l+1)\cdot(2\cdot N_{ID}^{cell}+1)(2\cdot\lfloor ANTPORT/4\rfloor+1)+1)+2ANTPORTNUM+N_{CP}$$

$$c_{init}=8\cdot(7\cdot(n_s+1)+l+1)\cdot(2\cdot N_{ID}^{cell}+1)(2\cdot\lfloor ANTPORT/4\rfloor+1)+1)+2ANTPORTNUM+N_{CP}$$

$$c_{init}=2^{10}\cdot(7\cdot(n_s+1)+l+1)\cdot(2\cdot N_{ID}^{cell}+1)+8\cdot\lfloor ANTPORT/2\rfloor+ANTPORTNUM+N_{CP}$$

wherein, $n_s$ is the time slot index in one radio frame, l is the OFDM index in one time slot, $N_{ID}^{cell}$ is the physical ID of the cell, when the subframe is the Normal CP subframe, $N_{CP}=1$, when the subframe is the Extended CP subframe, $N_{CP}=0$, ANTPORT is the CSI-RS antenna port index related parameter, and its value can be 0~7. ANTPORTNUM is the CSI-RS antenna port number related parameter of one cell. For example, when it's the CSI-RS 1 antenna port, the value of ANTPORTNUM is 2, when it's the CSI-RS 2 antenna port, the value of ANTPORTNUM is 3, when it's the CSI-RS 4 antenna port, the value of ANTPORTNUM is 4, when it's the CSI-RS 8 antenna port, the value of ANTPORTNUM is 5, or, when it's the CSI-RS 2 antenna port, the value of ANTPORTNUM is 0, when it's the CSI-RS 4 antenna port, the value of ANTPORTNUM is 1, when it's the CSI-RS 8 antenna port, the value of ANTPORTNUM is 2, the value of ANTPORTNUM is reserved for 3, or ANTPORTNUM is other values related to the number of the CSI-RS antenna ports of one cell.

In the step 2, the pseudo-random sequence c(n) is obtained in accordance with the following ways:

$$c(n)=(x_1(n+N_C)+x_2(n+N_C))\bmod 2$$

$$x_1(n+31)=(x_1(n+3)+x_1(n))\bmod 2$$

$$x_2(n+31)=(x_2(n+3)+x_2(n+2)+x_2(n+1)+x_2(n))\bmod 2$$

wherein, $x_1(0)=1$, $x_1(n)=0$, $n=1, 2, \ldots, 30$, $N_C=1600$, $x_2(n)=0$, $n=0, 1, 2, \ldots, 30$ are produced according to the pseudo-random sequence initial value $c_{init}=\Sigma_{q=0}^{30}x_2(q)\cdot 2^q$, and mod is a modular arithmetic.

In the step 3, the first CSI-RS sequence r(m) is generated in accordance with the following ways:

$$r(m)=\frac{1}{\sqrt{2}}(1-2\cdot c(2m))+j\frac{1}{\sqrt{2}}(1-2\cdot c(2m+1)),$$

$$m=0, 1, \ldots, 2N_{RB}^{max,DL}-1$$

or $$r(m)=\frac{1}{\sqrt{2}}(1-2\cdot c(2m))+j\frac{1}{\sqrt{2}}(1-2\cdot c(2m+1)),$$

$$m=\left\lceil\frac{1}{2}N_{RB}^{max,DL}\right\rceil,\ldots,\left\lceil\frac{3}{2}N_{RB}^{max,DL}\right\rceil-1$$

wherein, $N_{RB}^{max,DL}$ is the maximum bandwidth of the system, $N_{RB}^{max,DL}=110$.

In the steps 4~5,
in one application example, the first CSI-RS sequence r(m) is cut according to $$i'=i+\frac{\lfloor N_{RB}^{max,DL}-N_{RB}^{DL}\rfloor}{2}, i=0, 1, \ldots, N_{RB}^{DL}-1$$

to obtain the second CSI-RS sequence $r_{l,n_s}(i')$ on the time slot $n_s$ of the OFDM symbol l;

the second CSI-RS sequence $r_{l,n_s}(i')$ is mapped to the subcarrier k of the OFDM symbol l of the CSI-RS antenna port p, $a_{k,l}^{(p)}=w_{l''}r_{l,n_s}(i')$, wherein, $a_{k,l}^{(p)}$ is the value of RE corresponding to the CSI-RS antenna port p, and $w_{l''}$ is the orthogonal code factor;

wherein, $N_{RB}^{DL}$ is the actual system bandwidth, $$k=k'+12i+\begin{cases}-0 & p\in\{15, 16\}, \text{normal } CP \\ -6 & p\in\{17, 18\}, \text{normal } CP \\ -1 & p\in\{19, 20\}, \text{normal } CP \\ -7 & p\in\{21, 22\}, \text{normal } CP \\ -0 & p\in\{15, 16\}, \text{extended } CP \\ -3 & p\in\{17, 18\}, \text{extended } CP \\ -6 & p\in\{19, 20\}, \text{extended } CP \\ -9 & p\in\{21, 22\}, \text{extended } CP\end{cases}$$

$$l=\begin{cases}l' & \text{when using the extended } CP \text{ and the subframe structure type 1 or 2, the first symbol of the } CDM \text{ group} \\ l'+1 & \text{when using the extended } CP \text{ and the subframe structure type 1 or 2, the second symbol of the } CDM \text{ group} \\ l'+2 & \text{when using the normal } CP \text{ and the subframe structure type 2, the second symbol of the } CDM \text{ group}\end{cases}$$

$$l'' = \begin{cases} 0, l = l' \\ 1, l \neq l' \end{cases}, w_{l'} = \begin{cases} 1 & p \in \{15, 17, 19, 21\} \\ (-1)^{l''} & p \in \{16, 18, 20, 22\} \end{cases}$$

k' is a frequency domain location of the first CSI-RS antenna port, l' is an initial time domain location of the first CSI-RS antenna port of the CSI-RS, and the eNB can inform the UE of the parameter (k',l') through an explicit signaling; and the first CSI-RS sequence r(m) is $$r(m) = \frac{1}{\sqrt{2}}(1 - 2 \cdot c(2m)) + j\frac{1}{\sqrt{2}}(1 - 2 \cdot c(2m+1)),$$

$$m = 0, 1, \ldots, N_{RB}^{max,DL} - 1$$

In another application example, the first CSI-RS sequence r(m) is cut according to $$i' = i + \frac{\lfloor N_{RB}^{max,DL} - N_{RB}^{DL} \rfloor}{2}, i = 0, 1, \ldots, N_{RB}^{DL} - 1$$

to obtain the second CSI-RS sequence $r_{l,n_s}(i')$ on the time slot $n_s$ of the OFDM symbol l;

the second CSI-RS sequence $r_{l,n_s}(i')$ is mapped to the subcarrier k of the OFDM symbol l of the CSI-RS antenna port p, $a_{k,l}^{(p)} = w_{l''} r_{l,n_s}(i')$,
wherein, $$k = k' + 12i + \begin{cases} -0 & p \in \{15, 16\}, \text{normal } CP \\ -6 & p \in \{17, 18\}, \text{normal } CP \\ -1 & p \in \{19, 20\}, \text{normal } CP \\ -7 & p \in \{21, 22\}, \text{normal } CP \\ -0 & p \in \{15, 16\}, \text{extended } CP \\ -3 & p \in \{17, 18\}, \text{extended } CP \\ -6 & p \in \{19, 20\}, \text{extended } CP \\ -9 & p \in \{21, 22\}, \text{extended } CP \end{cases}$$

$$l = l' +$$

$$\begin{cases} l'' & \text{when using normal } CP, CSI\text{-}RS \text{ configuration index is } 0 \sim 19 \\ 2l'' & \text{when using normal } CP, CSI\text{-}RS \text{ configuration index is } 20 \sim 31 \\ l'' & \text{when using extended } CP, CSI\text{-}RS \text{ configuration index is } 0 \sim 27 \end{cases}$$

$$l'' \in \{0, 1\}, w_{l''} = \begin{cases} 1 & p \in \{15, 17, 19, 21\} \\ (-1)^{l''} & p \in \{16, 18, 20, 22\} \end{cases},$$

k' is the frequency domain location of the first CSI-RS antenna port, l' is the initial time domain location of the first CSI-RS antenna port of the CSI-RS, and the eNB can inform the UE of the parameter (k', l') through the explicit signaling; and the first CSI-RS sequence r(m) is $$r(m) = \frac{1}{\sqrt{2}}(1 - 2 \cdot c(2m)) + j\frac{1}{\sqrt{2}}(1 - 2 \cdot c(2m+1)),$$

$$m = 0, 1, \ldots, N_{RB}^{max,DL} - 1.$$

In another application example, the first CSI-RS sequence r(m) is cut to obtain the second CSI-RS sequence $r_{l,n_s}(i')$ on the time slot $n_s$ of the OFDM symbol l;

the second CSI-RS sequence $r_{l,n_s}(i')$ is mapped to the subcarrier k of the OFDM symbol l of the CSI-RS antenna port p, $a_{k,l}^{(p)} = w_{l''} r_{l,n_s}(i')$, wherein, $a_{k,l}^{(p)}$ is the value of RE corresponding to the CSI-RS antenna port p, and $w_{l''}$ is the orthogonal code factor;

$$\text{wherein, } i' = \begin{cases} i + \lfloor \frac{N_{RB}^{max,DL} - N_{RB}^{DL}}{2} \rfloor & l'' = 0 \\ i - N_{RB}^{DL} + \lfloor \frac{N_{RB}^{max,DL} - N_{RB}^{DL}}{2} \rfloor & l'' = 1, \end{cases}$$

$$i = 0, 1, \ldots, 2N_{RB}^{DL} - 1$$

$$k = k' + 12(i \bmod N_{RB}^{DL}) + \begin{cases} -0 & p \in \{15, 16\}, \text{normal } CP \\ -6 & p \in \{17, 18\}, \text{normal } CP \\ -1 & p \in \{19, 20\}, \text{normal } CP \\ -7 & p \in \{21, 22\}, \text{normal } CP \\ -0 & p \in \{15, 16\}, \text{extended } CP \\ -3 & p \in \{17, 18\}, \text{extended } CP \\ -6 & p \in \{19, 20\}, \text{extended } CP \\ -9 & p \in \{21, 22\}, \text{extended } CP \end{cases}$$

$$l = l' +$$

$$\begin{cases} l'' & \text{when using normal } CP, CSI\text{-}RS \text{ configuration index is } 0 \sim 19 \\ 2l'' & \text{when using normal } CP, CSI\text{-}RS \text{ configuration index is } 20 \sim 31 \\ l'' & \text{when using extended } CP, CSI\text{-}RS \text{ configuration index is } 0 \sim 27 \end{cases}$$

$$l'' = \lfloor i/N_{RB}^{DL} \rfloor \in \{0, 1\}, w_{l''} = \begin{cases} 1 & p \in \{15, 17, 19, 21\} \\ (-1)^{l''} & p \in \{16, 18, 20, 22\} \end{cases},$$

k' is the frequency domain location of the first CSI-RS antenna port, l' is the initial time domain location of the first CSI-RS antenna port of the CSI-RS, and the eNB can inform the UE of the parameter (k', l') through the explicit signaling; and the first CSI-RS sequence r(m) is $$r(m) = \frac{1}{\sqrt{2}}(1 - 2 \cdot c(2m)) + j\frac{1}{\sqrt{2}}(1 - 2 \cdot c(2m+1)),$$

$$m = 0, 1, \ldots, N_{RB}^{max,DL} - 1.$$

In another application example, the first CSI-RS sequence r(m) is cut to obtain the second CSI-RS sequence $r_{l,n_s}(i')$ on the time slot $n_s$ of the OFDM symbol l;

the second CSI-RS sequence $r_{l,n_s}(i')$ is mapped to the subcarrier k of the OFDM symbol l of the CSI-RS antenna port p, $a_{k,l}^{(p)} = w_{l''} r_{l,n_s}(i')$, wherein, $a_{k,l}^{(p)}$ is the value of RE corresponding to the CSI-RS antenna port p, and $w_{l''}$ is the orthogonal code factor;

wherein, $$i' = \begin{cases} i + N_{RB}^{max,DL} - \left\lfloor \dfrac{N_{RB}^{DL}}{2} \right\rfloor & l'' = 0 \\ i - N_{RB}^{DL} + N_{RB}^{max,DL} - \left\lfloor \dfrac{N_{RB}^{DL}}{2} \right\rfloor & l'' = 1 \end{cases}, \quad i = 0, 1, \ldots, 2N_{RB}^{DL} - 1$$

$$k = k' + 12(i \bmod N_{RB}^{DL}) + \begin{cases} -0 & p \in \{15, 16\}, \text{ normal } CP \\ -6 & p \in \{17, 18\}, \text{ normal } CP \\ -1 & p \in \{19, 20\}, \text{ normal } CP \\ -7 & p \in \{21, 22\}, \text{ normal } CP \\ -0 & p \in \{15, 16\}, \text{ extended } CP \\ -3 & p \in \{17, 18\}, \text{ extended } CP \\ -6 & p \in \{19, 20\}, \text{ extended } CP \\ -9 & p \in \{21, 22\}, \text{ extended } CP \end{cases}$$

$l = l' +$ $$\begin{cases} l'' & \text{when using normal } CP, CSI-RS \text{ configuration index is } 0 \sim 19 \\ 2l'' & \text{when using normal } CP, CSI-RS \text{ configuration index is } 20 \sim 31 \\ l'' & \text{when using extended } CP, CSI-RS \text{ configuration index is } 0 \sim 27 \end{cases}$$

$$l'' = \left\lfloor \dfrac{i}{N_{RB}^{DL}} \right\rfloor \in \{0, 1\},$$

$$w_{l'} = \begin{cases} 1 & p \in \{15, 17, 19, 21\} \\ (-1)^{l''} & p \in \{16, 18, 20, 22\}, \end{cases}$$

k' is the frequency domain location of the first CSI-RS antenna port, l' is the initial time domain location of the first CSI-RS antenna port of the CSI-RS, and the eNB can inform the UE of the parameter (k',l') through the explicit signaling; and the first CSI-RS sequence r(m) is $$r(m) = \dfrac{1}{\sqrt{2}}(1 - 2 \cdot c(2m)) + j\dfrac{1}{\sqrt{2}}(1 - 2 \cdot c(2m+1)),$$

$$m = \left\lceil \dfrac{1}{2} N_{RB}^{max,DL} \right\rceil, \ldots, \left\lceil \dfrac{3}{2} N_{RB}^{max,DL} \right\rceil - 1$$

Example two: the CSI-RS sequence is generated and mapped based on the subframe.

In the example, the CSI-RS sequence is generated and mapped in accordance with the following steps, and the mapped CSI-RS sequence is shown in FIG. 5~FIG. 8.

In step 1, a pseudo-random sequence initial value $c_{init}$ is generated.

In step 2, a pseudo-random sequence c(n) is generated.

In step 3, a QPSK modulation is performed on the pseudo-random sequence, and the first CSI-RS sequence r(m) is obtained according to the maximum bandwidth $N_{RB}^{max,DL}$ of the system.

In step 4, a location index i' is calculated according to the actual bandwidth $N_{RB}^{DL}$ of the system, and the first CSI-RS sequence r(m) is cut in accordance with the location index i', and the second CSI-RS sequence $r_{n_s}(i')$ is obtained on the subframe $$\left\lfloor \dfrac{n_s}{2} \right\rfloor.$$

In step 5, the second CSI-RS sequence $r_{n_s}(i')$ is mapped to the subcarrier k of the OFDM symbol l of the CSI-RS antenna port p, $a_{k,l}^{(p)} = w_{l''} \cdot r_{n_s}(i')$, wherein, $a_{k,l}^{(p)}$ is the value of RE corresponding to the CSI-RS antenna port p, $w_{l''}$ is the orthogonal code factor, and $n_s$ is the time slot index.

Wherein, the pseudo-random sequence is also called a scrambling code or a scrambling code sequence, and the pseudo-random sequence initial value is also called a scrambling code initial value.

In the step 1, in order to fully randomize interference between multiple cells, the parameter required in calculation of the initial value can be the time slot index and the cell ID. In one application example, the calculation of the scrambling code initial value adopts any one of the following formulas:

$c_{init} = (\lfloor n_s/2 \rfloor + 1) \cdot (2N_{ID}^{cell} + 1) \cdot 2^{16}$ $c_{init} = (\lfloor n_s/2 \rfloor + 1) \cdot (2N_{ID}^{cell} + 1)$ $c_{init} = (\lfloor n_s/2 \rfloor + 1) \cdot (2N_{ID}^{cell} + 1) \cdot 2^{16} + N_{ID}^{cell}$ $c_{init} = (\lfloor n_s/2 \rfloor + 1) \cdot (2N_{ID}^{cell} + 1) \cdot 2^9 + N_{ID}^{cell}$ wherein, $n_s$ is the time slot index in one radio frame, and $N_{ID}^{cell}$ is the physical ID of the cell.

Furthermore, the verification of CP is considered to be performed, the parameter required in calculation of the initial value can be the time slot index, the cell ID and the CP length factor. In one application example, the calculation of the scrambling code initial value adopts any one of the following formulas:

$c_{init} = (\lfloor n_s/2 \rfloor + 1) \cdot (2N_{ID}^{cell} + 1) \cdot 2^{16} + N_{ID}^{cell} + N^{CP}$ $c_{init} = (\lfloor n_s/2 \rfloor + 1) \cdot (2N_{ID}^{cell} + 1) \cdot 2^{16} + N_{CP}$ $c_{init} = (\lfloor n_s/2 \rfloor + 1) \cdot (2N_{ID}^{cell} + 1) \cdot (2^{10} + 2N_{ID}^{cell} + N_{CP}$ wherein: $n_s$ is the time slot index in one radio frame, and $N_{ID}^{cell}$ is the physical ID of the cell. When the subframe is the Normal CP subframe, $N_{CP}=1$, and when the subframe is the Extended CP subframe, $N_{CP}=0$.

Furthermore, the interference reduction of the measurement between CSI-RS antenna ports can be considered to be performed, and in one application example, the calculation of the scrambling code initial value adopts any one of the following formulas:

$c_{init} = (\lfloor n_s/2 \rfloor + 1) \cdot (2N_{ID}^{cell} + 1) \cdot (2 \cdot \lfloor ANTPORT/2 \rfloor + 1) \cdot 2^9 + N_{ID}^{cell}$ $c_{init} = (\lfloor n_s/2 \rfloor + 1) \cdot (2N_{ID}^{cell} + 1) \cdot (2 \cdot \lfloor ANTPORT/4 \rfloor + 1) \cdot 2^9 + N_{ID}^{cell}$ $c_{init} = (\lfloor n_s/2 \rfloor + 1) \cdot (2N_{ID}^{cell} + 1) \cdot (2 \cdot \lfloor ANTPORT/2 \rfloor + 1)$ $c_{init} = (\lfloor n_s/2 \rfloor + 1) \cdot (2N_{ID}^{cell} + 1) \cdot 2^{16} + \lfloor ANTPORT/2 \rfloor$ $c_{init} = (\lfloor n_s/2 \rfloor + 1) \cdot (2N_{ID}^{cell} + 1) \cdot 2^{16} + \lfloor ANTPORT/4 \rfloor$ wherein, $n_s$ is the time slot index in one radio frame, $N_{ID}^{cell}$ is the physical ID of the cell, ANTPORT is the CSI-RS antenna port index related parameter, and its value can be 0~7.

Furthermore, the interference reduction of the measurement between CSI-RS antenna ports and the verification of the CP length can be considered to be performed, and in one application example, the calculation of the scrambling code initial value adopts any one of the following formulas:

$$c_{init}=(\lfloor n_s/2 \rfloor+1)\cdot(2N_{ID}^{cell}+1)\cdot(2\cdot\lfloor ANTPORT/2 \rfloor+1)\cdot 2^{10}+2N_{ID}^{cell}+N_{CP}$$

$$c_{init}=(\lfloor n_s/2 \rfloor+1)\cdot(2N_{ID}^{cell}+1)\cdot(2\cdot\lfloor ANTPORT/4 \rfloor+1)\cdot 2^{10}+2N_{ID}^{cell}+N_{CP}$$

$$c_{init}=(\lfloor n_s/2 \rfloor+1)\cdot(2N_{ID}^{cell}+1)\cdot(2\cdot\lfloor ANTPORT/4 \rfloor+1)\cdot 2+N_{CP}$$

$$c_{init}=2^{16}\cdot(\lfloor n_s/2 \rfloor+1)\cdot(2N_{ID}^{cell}+1)\cdot 2\cdot\lfloor ANTPORT/4 \rfloor+N_{CP}$$

$$c_{init}=2^{16}\cdot(\lfloor n_s/2 \rfloor+1)\cdot(2N_{ID}^{cell}+1)\cdot 2\cdot\lfloor ANTPORT/2 \rfloor+N_{CP}$$

wherein, $n_s$ is the time slot index in one radio frame, $n_{ID}^{cell}$ is the physical ID of the cell, ANTPORT is the CSI-RS antenna port index related parameter, and its value can be 0~7. When the subframe is the Normal CP, $N_{CP}=1$, when the subframe is the Extended CP subframe, $N_{CP}=0$.

Furthermore, the verification of the CSI-RS antenna port is considered to be performed, and in one application example, the calculation of the scrambling code initial value adopts any one of the following formulas:

$$c_{init}=(\lfloor n_s/2 \rfloor+1)\cdot(2N_{ID}^{cell}+1)\cdot(2\cdot ANTPORTNUM+1)\cdot 2^{10}+2N_{ID}^{cell}+N_{CP}$$

$$c_{init}=(\lfloor n_s/2 \rfloor+1)\cdot(2N_{ID}^{cell}+1)\cdot(2\cdot ANTPORTNUM+1)\cdot 2+N_{CP}$$

$$c_{init}=(\lfloor n_s/2 \rfloor+1)\cdot(2N_{ID}^{cell}+1)\cdot 2^{12}+8N_{ID}^{cell}+4N_{CP}+ANTPORTNUM$$

$$c_{init}=(\lfloor n_s/2 \rfloor+1)\cdot(2N_{ID}^{cell}+1)\cdot 2^{12}+8N_{ID}^{cell}+2ANTPORTNUM+N_{CP}$$

$$c_{init}=(\lfloor n_s/2 \rfloor+1)\cdot(2N_{ID}^{cell}+1)\cdot 2^{3}+2ANTPORTNUM+N_{CP}$$

$$c_{init}=(\lfloor n_s/2 \rfloor+1)\cdot(2N_{ID}^{cell}+1)\cdot 2^{3}4N_{CP}+ANTPORTNUM$$

wherein, $n_s$ is the time slot index in one radio frame, $N_{ID}^{cell}$ is the physical ID of the cell, when the subframe is the Normal CP, ANTPORTNUM is the CSI-RS antenna port number related parameter of one cell. For example, when the number of CSI-RS antenna ports is 1, the value of ANTPORTNUM is 2, when the number of CSI-RS antenna ports is 2, the value of ANTPORTNUM is 3, when the number of CSI-RS antenna ports is 4, the value of ANTPORTNUM is 4, when the number of CSI-RS antenna ports is 8, the value of ANTPORTNUM is 5, or when the number of CSI-RS antenna ports is 2, the value of ANTPORTNUM is 0, when the number of CSI-RS antenna ports is 4, the value of ANTPORTNUM is 1, when the number of CSI-RS antenna ports is 8, the value of ANTPORTNUM is 2, the value of ANTPORTNUM is reserved for 3, or, ANTPORTNUM is other values related to the number of CSI-RS antenna ports of one cell.

Furthermore, if only the interference reduction of the measurement between CSI-RS antenna ports and the verification of the CSI-RS antenna port are considered to be performed and the verification of the CP is not considered, in one application example, the calculation of the scrambling code initial value adopts any one of the following formulas:

$$c_{init}=(\lfloor n_s/2 \rfloor+1)\cdot(2N_{ID}^{cell}+1)\cdot(2\cdot ANTPORTNUM+1)\cdot 2^{9}+N_{ID}^{cell}$$

$$c_{init}=(\lfloor n_s/2 \rfloor+1)\cdot(2N_{ID}^{cell}+1)\cdot(2\cdot ANTPORTNUM+1)$$

$$c_{init}=(\lfloor n_s/2 \rfloor+1)\cdot(2N_{ID}^{cell}+1)\cdot 2^{16}+ANTPORTNUM$$

$$c_{init}=(\lfloor n_s/2 \rfloor+1)\cdot(2N_{ID}^{cell}+1)\cdot 4+ANTPORTNUM$$

$$c_{init}=(\lfloor n_s/2 \rfloor+1)\cdot(2N_{ID}^{cell}+1)\cdot 2^{11}+4N_{ID}^{cell}+ANTPORTNUM$$

wherein: $n_s$ is the time slot index in one radio frame, $n_{ID}^{cell}$ is the physical ID of the cell, ANTPORTNUM is the CSI-RS antenna port number related parameter of one cell, when the number of CSI-RS antenna ports is 1, the value of ANTPORTNUM is 2, when the number of CSI-RS antenna ports is 2, the value of ANTPORTNUM is 3, when the number of CSI-RS antenna ports is 4, the value of ANTPORTNUM is 4, when the number of CSI-RS antenna ports is 8, the value of ANTPORTNUM is 5, or when the number of CSI-RS antenna ports is 2, the value of ANTPORTNUM is 0, when the number of CSI-RS antenna ports is 4, the value of ANTPORTNUM is 1, when the number of CSI-RS antenna ports is 8, the value of ANTPORTNUM is 2, the value of ANTPORTNUM is reserved for 3, or, ANTPORTNUM is other values related to the number of CSI-RS antenna ports of one cell.

Furthermore, in order to make the interference of CSI-RS antenna ports located in two adjacent subcarriers of the same cell randomized and consider that the number of CSI-RS antenna ports of the cell can be blindly detected and also the length of the CP is required to be detected, the parameter required in calculation of such initial value can be the time slot index, the cell ID, the CSI-RS antenna port number related parameter, the CSI-RS antenna port index related parameter and the CP length factor. In one application example, the calculation of the scrambling code initial value adopts any one of the following formulas:

$$c_{init}=(\lfloor n_s/2 \rfloor+1)\cdot(2N_{ID}^{cell}+1)\cdot(2\cdot\lfloor ANTPORT/4 \rfloor+1)\cdot 2^{11}+4N_{ID}^{cell}+ANTPORTNUM$$

$$c_{init}=(\lfloor n_s/2 \rfloor+1)\cdot(2N_{ID}^{cell}+1)\cdot(2\cdot\lfloor ANTPORT/4 \rfloor+1)\cdot 4+ANTPORTNUM$$

$$c_{init}=(\lfloor n_s/2 \rfloor+1)\cdot(2N_{ID}^{cell}+1)\cdot(2\cdot\lfloor ANTPORT/4 \rfloor+1)\cdot 2^{16}+ANTPORTNUM$$

$$c_{init}=(\lfloor n_s/2 \rfloor+1)\cdot(2N_{ID}^{cell}+1)\cdot 2^{16}+8\cdot\lfloor ANTPORT/2 \rfloor++ANTPORTNUM$$

$$c_{init}=(\lfloor n_s/2 \rfloor+1)\cdot(2N_{ID}^{cell}+1)\cdot 2^{16}+8\cdot\lfloor ANTPORT/4 \rfloor++ANTPORTNUM$$

$$c_{init}=(\lfloor n_s/2 \rfloor+1)\cdot(2N_{ID}^{cell}+1)\cdot 2^{16}+2^{4}\cdot\lfloor ANTPORT/2 \rfloor+2\cdot ANTPORTNUM+N_{CP}$$

$$c_{init}=(\lfloor n_s/2 \rfloor+1)\cdot(2N_{ID}^{cell}+1)\cdot 2^{16}+2^{4}\cdot\lfloor ANTPORT/4 \rfloor+2\cdot ANTPORTNUM+N_{CP}$$

$$c_{init}=(\lfloor n_s/2 \rfloor+1)\cdot(2N_{ID}^{cell}+1)\cdot 2^{16}+8\cdot\lfloor ANTPORT/4 \rfloor++ANTPORTNUM$$

wherein, $n_s$ is the time slot index in one radio frame, $N_{ID}^{cell}$ is the physical ID of the cell, when the subframe is the Normal CP, $N_{CP}=1$, when the subframe is the Extended CP subframe, $N_{CP}=0$, ANTPORT is the CSI-RS antenna port index related parameter, and its value can be 0~7. ANTPORTNUM is the CSI-RS antenna port number related parameter of one cell. For example, when the number of CSI-RS antenna ports is 1, the value of ANTPORTNUM is 2, when the number of CSI-RS antenna ports is 2, the value of ANTPORTNUM is 3, when the number of CSI-RS antenna ports is 4, the value of ANTPORTNUM is 4, when the number of CSI-RS antenna ports is 8, the value of ANTPORTNUM is 5, or when the number of CSI-RS antenna ports is 2, the value of ANTPORTNUM is 0, when the number of CSI-RS antenna ports is 4, the value of ANTPORTNUM is 1, when the number of CSI-RS antenna ports is 8, the value of ANTPORTNUM is 2, the value of ANTPORTNUM is reserved for 3, or, ANTPORTNUM is other values related to the number of CSI-RS antenna ports of one cell.

In the step 2, the pseudo-random sequence c(n) is generated in accordance with the following ways:

$$c(n)=(x_1(n+N_C)+x_2(n+N_C)) \bmod 2$$

$$x_1(n+31)=(x_1(n+3)+x_1(n)) \bmod 2$$

$$x_2(n+31)=(x_2(n+3)+x_2(n+2)+x_2(n+1)+x_2(n)) \bmod 2$$

wherein, $x_1(0)=1$, $x_1(n)=0$, $n=1, 2, \ldots, 30$, $N_C=1600$, $x_2(n)=0$, $n=0, 1, 2, \ldots, 30$ are produced according to the pseudo-random sequence initial value $c_{init}=\Sigma_{q=0}^{30} x_2(q) \cdot 2^q$, and mod is a modular arithmetic.

In the step 3, the first CSI-RS sequence r(m) is generated in accordance with the following ways:

$$r(m) = \frac{1}{\sqrt{2}}(1 - 2 \cdot c(2m)) + j\frac{1}{\sqrt{2}}(1 - 2 \cdot c(2m + 1)),$$

$$m = 0, 1, \ldots, 2N_{RB}^{max,DL} - 1$$

wherein, $N_{RB}^{max,DL}$ is the maximum bandwidth of the system, $N_{RB}^{max,DL}=110$.

In the steps 4~5, in one application example, the first CSI-RS sequence r(m) is cut in accordance with $i'=i+N_{RB}^{max,DL}-N_{RB}^{DL}$, $i=0, 1, \ldots, 2N_{RB}^{DL}-1$ to obtain the second CSI-RS sequence $r_{n_s}(i')$ on the subframe $$\left\lfloor \frac{n_s}{2} \right\rfloor;$$

the second CSI-RS sequence $r_{n_s}(i')$ is mapped to the subcarrier k of the OFDM symbol l of the CSI-RS antenna port p, $a_{k,l}^{(p)}=w_{l''} \cdot r_{n_s}(i')$, wherein, $a_{k,l}^{(p)}$ is the value of RE corresponding to the CSI-RS antenna port p, and $w_{l''}$ is the orthogonal code factor;

wherein, $$k = k' + 12(i \bmod N_{RB}^{DL}) + \begin{cases} -0 & p \in \{15, 16\}, \text{normal } CP \\ -6 & p \in \{17, 18\}, \text{normal } CP \\ -1 & p \in \{19, 20\}, \text{normal } CP \\ -7 & p \in \{21, 22\}, \text{normal } CP \\ -0 & p \in \{15, 16\}, \text{extended } CP \\ -3 & p \in \{17, 18\}, \text{extended } CP \\ -6 & p \in \{19, 20\}, \text{extended } CP \\ -9 & p \in \{21, 22\}, \text{extended } CP \end{cases}$$

$$l = l' +$$

$$\begin{cases} l'' & \text{when using normal } CP, CSI - RS \text{ configuration index is } 0 \sim 19 \\ 2l'' & \text{when using normal } CP, CSI - RS \text{ configuration index is } 20 \sim 31 \\ l'' & \text{when using extended } CP, CSI - RS \text{ configuration index is } 0 \sim 27 \end{cases}$$

$$l'' = \left\lfloor \frac{i}{N_{RB}^{DL}} \right\rfloor \in \{0, 1\},$$

$$w_{l'} = \begin{cases} 1 & p \in \{15, 17, 19, 21\} \\ (-1)^{l''} & p \in \{16, 18, 20, 22\}, \end{cases}$$

k' is the frequency domain location of the first CSI-RS antenna port, l' is the initial time domain location of the first CSI-RS antenna port of the CSI-RS, and the eNB can inform the UE of the parameter (k',l') through the explicit signaling; and $n_s$ is the time slot index in one radio frame.

A device for generating and mapping the CSI-RS sequence according to examples of the present invention comprises a generating unit and a mapping unit, wherein:

the generating unit is configured to: generate a pseudo-random sequence according to a pseudo-random sequence initial value, perform a QPSK modulation on the pseudo-random sequence, and obtain a first CSI-RS sequence according to the maximum bandwidth of a system;

the mapping unit is configured to: cut the first CSI-RS sequence according to the actual bandwidth of the system, obtain a second CSI-RS sequence, and map the second CSI-RS sequence to a time frequency location of a CSI-RS antenna port.

The device generates and maps the CSI-RS sequence based on an OFDM symbol or a subframe, that is, the generating unit generates the pseudo-random sequence based on the OFDM symbol or the subframe and obtains the first CSI-RS sequence;

the mapping unit maps the second CSI-RS sequence to the time frequency location of the CSI-RS antenna port in the following ways:

when the CSI-RS sequence is mapped based on the OFDM symbol, the second CSI-RS sequences mapped on different OFDM symbols which are located in the same CDM group are produced from different first CSI-RS sequences;

when the CSI-RS sequence is mapped based on the subframe, the second CSI-RS sequences mapped on different OFDM symbols which are located in the same CDM group are produced from different parts of the same first CSI-RS sequence.

The specific implementation of the generating unit and mapping unit can refer to the descriptions in example one and example two, which will not be repeated here.

An eNB according to the examples of the present invention comprises a device for generating and mapping CSI-RS sequence, and the device comprises the above generating unit and mapping unit.

A UE according to the examples of the present invention comprises a generating unit, a mapping acquiring unit, a receiving unit and a measuring unit, wherein:

the generating unit is configured to: generate a pseudo-random sequence according to a pseudo-random sequence initial value, perform a QPSK modulation on the pseudo-random sequence, and obtain a first CSI-RS sequence according to the maximum bandwidth of a system;

the mapping acquiring unit is configured to: cut the first CSI-RS sequence according to the actual bandwidth of the system, obtain the second CSI-RS sequence used to be mapped to a time frequency location of a CSI-RS antenna port;

the receiving unit is configured to receive the CSI-RS sequence sent by an evolved Node B (eNB) in the time frequency location of the CSI-RS antenna port;

the measuring unit calculates the CSI-RS sequence received by the receiving unit and the second CSI-RS sequence obtained by the mapping acquiring unit, and performs channel estimation and channel measurement.

The specific implementation of the generating unit and mapping acquiring unit can refer to the descriptions in example one and example two, which will not be repeated here.

The ordinary people skilled in the art can understand that all or parts of the steps in the above method can be completed by a program instructing the relevant hardware, and the program can be stored in a computer readable memory medium, such as a read-only memory, disc disk and optical disk and so on. Alternatively, all or parts of steps in the above examples can also be implemented by using one or multiple integrated circuits. Correspondingly, each module/unit in the above examples can be implemented by using a form of hardware, and also can be implemented by using a form of software function module. The present invention is not limited to any specific form of the combination of hardware and software.

The above description is only the preferred examples of the present invention, which is not intended to limit the present invention, and there are various modifications and changes in the present invention for the skilled in the art. All the modifications, equivalent replacements and improvements and so on made within the spirit and principle of the present invention shall fall into the protection scope of the present invention.

INDUSTRIAL APPLICABILITY

Compared with the existing technology, the CSI-RS reference signal sequence can be generated or obtained respectively at the UE terminal and eNB terminal in accordance with the stated methods for generating and mapping the reference sequence according to the known parameters by the present invention, so that the calculated CSI-RS sequence can be utilized to measure the channel at the UE terminal.

What is claimed is:

1. A device for generating and mapping a Channel State Information Reference Signal (CSI-RS) sequence, comprising a generating unit and a mapping unit, wherein:
the generating unit is configured to: generate a pseudo-random sequence according to a pseudo-random sequence initial value, perform a Quadrature Phase-Shift Keying (QPSK) modulation on the pseudo-random sequence, and obtain a first CSI-RS sequence according to maximum bandwidth of system; generate the pseudo-random sequence and obtain the first CSI-RS sequence based on an Orthogonal Frequency Division Multiplexing (OFDM) symbol or a subframe; generate the pseudo-random sequence and obtain the first CSI-RS sequence based on the OFDM symbol; obtain the pseudo-random sequence initial value $c_{init}$ according to a time slot index, an OFDM symbol index in one time slot and a cell identity (ID), or,
obtain the pseudo-random sequence initial value $c_{init}$ according to one or more of three parameters of a CSI-RS antenna port number related parameter, a CSI-RS antenna port index related parameter and a Cyclic Prefix (CP) length factor, and the time slot index, the OFDM symbol index in one time slot and the cell ID;
the mapping unit is configured to: cut the first CSI-RS sequence according to an actual bandwidth of the system, obtain a second CSI-RS sequence, and map the second CSI-RS sequence to a time frequency location of a CSI-RS antenna port; cut the first CSI-RS sequence to obtain the second CSI-RS sequence and map the second CSI-RS sequence to the time frequency location of the CSI-RS antenna port in a following way:
when the second CSI-RS sequence is mapped based on the OFDM symbol, second CSI-RS sequences mapped on two OFDM symbols which are located in a same CDM group are produced from different first CSI-RS sequences;

when the second CSI-RS sequence is mapped based on the subframe, second CSI-RS sequences mapped on two OFDM symbols which are located in the same CDM group are produced from different parts of same first CSI-RS sequence.

2. The device according to claim 1, wherein,
the pseudo-random sequence initial value $c_{init}$ can be one of following values:

$c_{init}=2^9 \cdot (7 \cdot (n_s+1)+l+1) \cdot (2 \cdot N_{ID}^{cell}+1)+N_{ID}^{cell}$;

$c_{init}=2^9 \cdot (7 \cdot (n_s+1)+l+1) \cdot (2 \cdot N_{ID}^{cell}+1)$;

$c_{init}=(7 \cdot (n_s+1)+l+1) \cdot (2 \cdot N_{ID}^{cell}+1)$;

$c_{init}=2^{10} \cdot (7 \cdot (n_s+1)+l+1) \cdot (2 \cdot N_{ID}^{cell}+1)+2 \cdot N_{ID}^{cell} N_{CP}$;

$c_{init}=2^{10} \cdot (7 \cdot (n_s+1)+l+1) \cdot (2 \cdot N_{ID}^{cell}+1)+N_{CP}$;

$c_{init}=2 \cdot (7 \cdot (n_s+1)+l+1) \cdot (2 \cdot N_{ID}^{cell}+1)+N_{CP}$;

$c_{init}=2^9 \cdot (7 \cdot (n_s+1)+l+1) \cdot (2 \cdot N_{ID}^{cell}+1) \cdot (2 \cdot \lfloor ANTPORT/4 \rfloor+1)+N_{ID}^{cell}$;

$c_{init}=2^9 \cdot (7 \cdot (n_s+1)+l+1) \cdot (2 \cdot N_{ID}^{cell}+1) \cdot (2 \cdot \lfloor ANTPORT/2 \rfloor+1)+N_{ID}^{cell}$;

$c_{init}=(7 \cdot (n_s+1)+l+1) \cdot (2 \cdot N_{ID}^{cell}+1) \cdot (2 \cdot \lfloor ANTPORT/4 \rfloor+1)$;

$c_{init}=(7 \cdot (n_s+1)+l+1) \cdot (2 \cdot N_{ID}^{cell}+1) \cdot (2 \cdot \lfloor ANTPORT/2 \rfloor+1)$;

$c_{init}=4 \cdot (7 \cdot (n_s+1)+l+1) \cdot (2 \cdot N_{ID}^{cell}+1)+\lfloor ANTPORT/2 \rfloor$;

$c_{init}=2 \cdot (7 \cdot (n_s+1)+l+1) \cdot (2 \cdot N_{ID}^{cell}+1)+\lfloor ANTPORT/4 \rfloor$;

$c_{init}=2^9 \cdot (7 \cdot (n_s+1)+l+1) \cdot (2 \cdot N_{ID}^{cell}+1)+\lfloor ANTPORT/2 \rfloor$;

$c_{init}=2^9 \cdot (7 \cdot (n_s+1)+l+1) \cdot (2 \cdot N_{ID}^{cell}+1)+\lfloor ANTPORT/4 \rfloor$;

$c_{init}=2^{10} \cdot (7 \cdot (n_s+1)+l+1) \cdot (2 \cdot N_{ID}^{cell}+1)+\lfloor ANTPORT/2 \rfloor$;

$c_{init}=2^{10} \cdot (7 \cdot (n_s+1)+l+1) \cdot (2 \cdot N_{ID}^{cell}+1)+\lfloor ANTPORT/4 \rfloor$;

$c_{init}=2^{10} \cdot (7 \cdot (n_s+1)+l+1) \cdot (2 \cdot N_{ID}^{cell}+1)+\lfloor ANTPORT/2 \rfloor$;

$c_{init}=2^{10} \cdot (7 \cdot (n_s+1)+l+1) \cdot (2 \cdot N_{ID}^{cell}+1)+2 \cdot N_{ID}^{cell}+\lfloor ANTPORT/4 \rfloor$;

$c_{init}=2^{11} \cdot (7 \cdot (n_s+1)+l+1) \cdot (2 \cdot N_{ID}^{cell}+1)+4 \cdot N_{ID}^{cell}+\lfloor ANTPORT/2 \rfloor$;

$c_{init}=2^{10} \cdot (7 \cdot (n_s+1)+l+1) \cdot (2 \cdot N_{ID}^{cell}+1) \cdot (2 \cdot \lfloor ANTPORT/4 \rfloor+1)+2N_{ID}^{cell}+N_{CP}$;

$c_{init}=2^{10} \cdot (7 \cdot (n_s+1)+l+1) \cdot (2 \cdot N_{ID}^{cell}+1) \cdot (2 \cdot \lfloor ANTPORT/2 \rfloor+1)+2N_{ID}^{cell}+N_{CP}$;

$c_{init}=2 \cdot (7 \cdot (n_s+1)+l+1) \cdot (2 \cdot N_{ID}^{cell}+1) \cdot (2 \cdot \lfloor ANTPORT/4 \rfloor+1)+1)+N_{CP}$;

$c_{init}=8 \cdot (7 \cdot (n_s+1)+l+1) \cdot (2 \cdot N_{ID}^{cell}+1)+2 \cdot \lfloor ANTPORT/2 \rfloor+N_{CP}$;

$c_{init}=4 \cdot (7 \cdot (n_s+1)+l+1) \cdot (2 \cdot N_{ID}^{cell}+1)+2 \cdot \lfloor ANTPORT/4 \rfloor+N_{CP}$;

$c_{init}=2^9 \cdot (7 \cdot (n_s+1)+l+1) \cdot (2 \cdot N_{ID}^{cell}+1)+2 \cdot \lfloor ANTPORT/2 \rfloor+N_{CP}$;

$c_{init}=2^9 \cdot (7 \cdot (n_s+1)+l+1) \cdot (2 \cdot N_{ID}^{cell}+1)+2 \cdot \lfloor ANTPORT/4 \rfloor+N_{CP}$;

$c_{init}=2^{10}\cdot(7\cdot(n_s+1)+l+1)\cdot(2\cdot N_{ID}^{cell}+1)+2\cdot\lfloor ANTPORT/4 \rfloor+N_{CP}$;

$c_{init}=2^{10}\cdot(7\cdot(n_s+1)+l+1)\cdot(2\cdot N_{ID}^{cell}+1)+2\cdot\lfloor ANTPORT/2 \rfloor+N_{CP}$;

$c_{init}=2^9\cdot(7\cdot(n_s+1)+l+1)\cdot(2\cdot N_{ID}^{cell}+1)\cdot 2\cdot ANTPORT-NUM+1)+N_{ID}^{cell}$;

$c_{init}=2^9\cdot(7\cdot(n_s+1)+l+1)\cdot(2\cdot N_{ID}^{cell}+1)\cdot 2\cdot ANTPORT-NUM+1)$;

$c_{init}=2^{11}\cdot(7\cdot(n_s+1)+l+1)\cdot(2\cdot N_{ID}^{cell}+1)+4N_{ID}^{cell}+ANTPORTNUM$;

$c_{init}=2^9\cdot(7\cdot(n_s+1)+l+1)\cdot(2\cdot N_{ID}^{cell}+1)+ANTPORTNUM$;

$c_{init}=4\cdot(7\cdot(n_s+1)+l+1)\cdot(2\cdot N_{ID}^{cell}+1)+ANTPORTNUM$;

$c_{init}=2^9\cdot(7\cdot(n_s+1)+l+1)\cdot(2\cdot N_{ID}^{cell}+1)\cdot(2\cdot ANTPORT-NUM+1)+N_{ID}^{cell}$;

$c_{init}=2^{11}\cdot(7\cdot(n_s+1)+l+1)\cdot(2\cdot N_{ID}^{cell}+1)+4N_{ID}^{cell}+ANTPORTNUM$;

$c_{init}=2^{12}\cdot(7\cdot(n_s+1)+l+1)\cdot(2\cdot N_{ID}^{cell}+1)+8N_{ID}^{cell}+4N_{CP}+ANTPORTNUM$;

$c_{init}=2^9\cdot(7\cdot(n_s+1)+l+1)\cdot(2\cdot N_{ID}^{cell}+1)+4N_{CP}+ANTPORTNUM$;

$c_{init}=8\cdot(7\cdot(n_s+1)+l+1)\cdot(2\cdot N_{ID}^{cell}+1)+4N_{CP}+ANTPORTNUM$;

$c_{init}=2^{12}\cdot(7\cdot(n_s+1)+l+1)\cdot(2\cdot N_{ID}^{cell}+1)+8N_{ID}^{cell}+2ANTPORTNUM+N_{CP}$;

$c_{init}=2^9\cdot(7\cdot(n_s+1)+l+1)\cdot(2\cdot N_{ID}^{cell}+1)+2ANTPORTNUM+N_{CP}$;

$c_{init}=8\cdot(7\cdot(n_s+1)+l+1)\cdot(2\cdot N_{ID}^{cell}+1)+2ANTPORTNUM+N_{CP}$;

$c_{init}=2^{11}\cdot(7\cdot(n_s+1)+l+1)\cdot(2\cdot N_{ID}^{cell}+1)(2\cdot\lfloor ANTPORT/4 \rfloor+1)+4N_{ID}^{cell}+ANTPORTNUM$;

$c_{init}=2^9\cdot(7\cdot(n_s+1)+l+1)\cdot(2\cdot N_{ID}^{cell}+1)(2\cdot\lfloor ANTPORT/4 \rfloor+1)+ANTPORTNUM$;

$c_{init}=4\cdot(7\cdot(n_s+1)+l+1)\cdot(2\cdot N_{ID}^{cell}+1)(2\cdot\lfloor ANTPORT/4 \rfloor+1)+ANTPORTNUM$;

$c_{init}=2^{10}\cdot(7\cdot(n_s+1)+l+1)\cdot(2\cdot N_{ID}^{cell}+1)+8\cdot\lfloor ANTPORT/4 \rfloor+ANTPORTNUM$;

$c_{init}=2^{10}\cdot(7\cdot(n_s+1)+l+1)\cdot(2\cdot N_{ID}^{cell}+1)+8\cdot\lfloor ANTPORT/2 \rfloor+ANTPORTNUM$;

$c_{init}=2^9\cdot(7\cdot(n_s+1)+l+1)\cdot(2\cdot N_{ID}^{cell}+1)(2\cdot\lfloor ANTPORT/4 \rfloor+1)+8N_{ID}^{cell}+4N_{CP}+ANTPORTNUM$;

$c_{init}=2^9\cdot(7\cdot(n_s+1)+l+1)\cdot(2\cdot N_{ID}^{cell}+1)(2\cdot\lfloor ANTPORT/4 \rfloor+1)+4N_{CP}+ANTPORTNUM$;

$c_{init}=2^{12}\cdot(7\cdot(n_s+1)+l+1)\cdot(2\cdot N_{ID}^{cell}+1)(2\cdot\lfloor ANTPORT/4 \rfloor+1)+8N_{ID}^{cell}+2ANTPORTNUM+N_{CP}$;

$c_{init}=2^9\cdot(7\cdot(n_s+1)+l+1)\cdot(2\cdot N_{ID}^{cell}+1)(2\cdot\lfloor ANTPORT/4 \rfloor+1)+2ANTPORTNUM+N_{CP}$;

$c_{init}=8\cdot(7\cdot(n_s+1)+l+1)\cdot(2\cdot N_{ID}^{cell}+1)(2\cdot\lfloor ANTPORT/4 \rfloor+1)+2ANTPORTNUM+N_{CP}$;

$c_{init}=2^{10}\cdot(7\cdot(n_s+1)+l+1)\cdot(2\cdot N_{ID}^{cell}+1)+8\cdot\lfloor ANTPORT/2 \rfloor+ANTPORTNUM+N_{CP}$;

wherein, $n_s$ is the time slot index in one radio frame, l is an OFDM index in one time slot, $N_{ID}^{cell}$ is the cell ID, and $N_{CP}$ is the Cyclic Prefix (CP) length factor of one subframe, when the subframe is a normal CP subframe, $N_{CP}=1$, when the subframe is an extended CP subframe, $N_{CP}=0$; ANTPORT is the CSI-RS antenna port index related parameter, and ANTPORTNUM is the CSI-RS antenna port number related parameter of cell.

3. A device for generating and mapping a Channel State Information Reference Signal (CSI-RS) sequence, comprising a generating unit and a mapping unit, wherein:

the generating unit is configured to: generate a pseudo-random sequence according to a pseudo-random sequence initial value, perform a Quadrature Phase-Shift Keying (QPSK) modulation on the pseudo-random sequence, and obtain a first CSI-RS sequence according to maximum bandwidth of system; generate the pseudo-random sequence and obtain the first CSI-RS sequence based on an Orthogonal Frequency Division Multiplexing (OFDM) symbol or a subframe; generate the pseudo-random sequence c(n) based on the OFDM symbol in accordance with following ways:

$c(n)=(x_1(n+N_C)+x_2(n+N_C))\bmod 2$ $x_1(n+31)=(x_1(n+3)+x_1(n))\bmod 2$ $x_2(n+31)=(x_2(n+3)+x_2(n+2)+x_2(n+1)+x_2(n))\bmod 2$ wherein, $x_1(0)=1$, $x_1(n)=0$, $n=1, 2, \ldots, 30$, $N_C=1600$, $x_2(n)=0$, $n=0, 1, 2, \ldots, 30$ are produced according to the pseudo-random sequence initial value $c_{init}=\Sigma_{q=0}^{30}x_2(q)\cdot 2^q$, and mod is a modular arithmetic;

and the first CSI-RS sequence r(m) based on the OFDM symbol in accordance with following ways:

$$r(m) = \frac{1}{\sqrt{2}}(1 - 2\cdot c(2m)) + j\frac{1}{\sqrt{2}}(1 - 2\cdot c(2m+1)),$$

$$m = 0, 1, \ldots, N_{RB}^{max,DL} - 1$$

or $$r(m) = \frac{1}{\sqrt{2}}(1 - 2\cdot c(2m)) + j\frac{1}{\sqrt{2}}(1 - 2\cdot c(2m+1)),$$

$$m = \left\lceil\frac{1}{2}N_{RB}^{max,DL}\right\rceil, \ldots, \left\lceil\frac{3}{2}N_{RB}^{max,DL}\right\rceil - 1$$

wherein, $N_{RB}^{max,DL}$ is the maximum bandwidth of the system, $N_{RB}^{max,DL}=110$;

the mapping unit is configured to: cut the first CSI-RS sequence according to an actual bandwidth of the system, obtain a second CSI-RS sequence, and map the second CSI-RS sequence to a time frequency location of a CSI-RS antenna port; cut the first CSI-RS sequence to obtain the second CSI-RS sequence and map the second CSI-RS sequence to the time frequency location of the CSI-RS antenna port in a following way:

when the second CSI-RS sequence is mapped based on the OFDM symbol, second CSI-RS sequences mapped on two OFDM symbols which are located in a same CDM group are produced from different first CSI-RS sequences;

when the second CSI-RS sequence is mapped based on the subframe, second CSI-RS sequences mapped on two OFDM symbols which are located in the same CDM group are produced from different parts of same first CSI-RS sequence.

4. The device according to claim 3, wherein,
the mapping unit is configured to obtain and map the second CSI-RS sequence based on the OFDM symbol in accordance with following ways:
calculating a location index i' according to the actual bandwidth $N_{RB}^{DL}$ of the system and cutting the first CSI-RS sequence r(m) in accordance with the location index i' to obtain the second CSI-RS sequence $r_{l,n_s}$(i') of the OFDM symbol l on time slot $n_s$;
mapping the second CSI-RS sequence $r_{l,n_s}$(i') to a subcarrier k of the OFDM symbol l of the CSI-RS antenna port p via $a_{k,l}^{(p)} = w_{l''} \cdot r_{l,n_s}$(i'), wherein $a_{k,l}^{(p)}$ is a value of Resource Element (RE) corresponding to the CSI-RS antenna port p, and $w_{l''}$ is an orthogonal code factor.

5. The device according to claim 4, wherein,
the location index is $$i' = i + \frac{\lfloor N_{RB}^{max,DL} - N_{RB}^{DL} \rfloor}{2}, i = 0, 1, \ldots, N_{RB}^{DL} - 1;$$

the mapping unit is configured to map the second CSI-RS sequence $r_{l,n_s}$(i') to the subcarrier k of the OFDM symbol l of the CSI-RS antenna port p in accordance with following ways:

$$k = k' + 12i + \begin{cases} -0 & p \in \{15, 16\}, \text{ normal } CP \\ -6 & p \in \{17, 18\}, \text{ normal } CP \\ -1 & p \in \{19, 20\}, \text{ normal } CP \\ -7 & p \in \{21, 22\}, \text{ normal } CP \\ -0 & p \in \{15, 16\}, \text{ extended } CP \\ -3 & p \in \{17, 18\}, \text{ extended } CP \\ -6 & p \in \{19, 20\}, \text{ extended } CP \\ -9 & p \in \{21, 22\}, \text{ extended } CP, \end{cases}$$

$$l = l' + \begin{cases} l'' & \text{when using normal } CP, CSI-RS \text{ configuration index is } 0 \sim 19 \\ 2l'' & \text{when using normal } CP, CSI-RS \text{ configuration index is } 20 \sim 31 \\ l'' & \text{when using extended } CP, CSI-RS \text{ configuration index is } 0 \sim 27, \end{cases}$$

$l'' \in \{0, 1\}$, $$w_{l'} = \begin{cases} 1 & p \in \{15, 17, 19, 21\} \\ (-1)^{l''} & p \in \{16, 18, 20, 22\}, \end{cases}$$

wherein, k' is a frequency domain location of first CSI-RS antenna port, l' is an initial time domain location of the first CSI-RS antenna port, and the first CSI-RS sequence r(m) is $$r(m) = \frac{1}{\sqrt{2}}(1 - 2 \cdot c(2m)) + j \frac{1}{\sqrt{2}}(1 - 2 \cdot c(2m+1)),$$

$$m = 0, 1, \ldots, 2N_{RB}^{max,DL} - 1.$$

6. An User Equipment (UE), comprising a generating unit, a mapping acquiring unit, a receiving unit and a measuring unit, wherein:
the generating unit is configured to: generate a pseudo-random sequence according to a pseudo-random sequence initial value, perform a Quadrature Phase-Shift Keying (QPSK) modulation on the pseudo-random sequence, and obtain a first Channel State Information Reference Signal (CSI-RS) sequence according to maximum bandwidth of system; generate the pseudo-random sequence and obtain the first CSI-RS sequence based on an Orthogonal Frequency Division Multiplexing (OFDM) symbol or a subframe;
the mapping acquiring unit is configured to: cut the first CSI-RS sequence according to an actual bandwidth of the system, and obtain a second CSI-RS sequence configured to be mapped to a time frequency location of a CSI-RS antenna port; obtain the second CSI-RS sequence configured to be mapped to the time frequency location of the CSI-RS antenna port in a following way:
when the second CSI-RS sequence is obtained based on the OFDM symbol, second CSI-RS sequences mapped on two OFDM symbols which are located in a same CDM group are produced from different first CSI-RS sequences;
when the second CSI-RS sequence is obtained based on the subframe, second CSI-RS sequences mapped on two OFDM symbols which are located in the same CDM group are produced from different parts of same first CSI-RS sequence;
the receiving unit is configured to receive a CSI-RS sequence sent by an evolved Node B (eNB) in the time frequency location of the CSI-RS antenna port;
the measuring unit is configured to calculate the CSI-RS sequence received by the receiving unit and the second CSI-RS sequence obtained by the mapping acquiring unit, and perform a channel estimation and a channel measurement.

7. The UE according to claim 6, wherein,
the generating unit is configured to generate the pseudo-random sequence and obtain the first CSI-RS sequence based on the OFDM symbol;
the generating unit is further configured to:
obtain the pseudo-random sequence initial value $c_{init}$ according to a time slot index, an OFDM symbol index in one time slot and a cell identity (ID), or,
obtain the pseudo-random sequence initial value $c_{init}$ according to one or more of three parameters of a CSI-RS antenna port number related parameter, a CSI-RS antenna port index related parameter and a Cyclic Prefix (CP) length factor, and the time slot index, the OFDM symbol index in one time slot and the cell ID.

8. The UE according to claim 7, wherein,
the pseudo-random sequence initial value $c_{init}$ can be one of following values:

$c_{init} = 2^9 \cdot (7 \cdot (n_s+1)+l+1) \cdot (2 \cdot N_{ID}^{cell}+1) + N_{ID}^{cell}$;

$c_{init} = 2^9 \cdot (7 \cdot (n_s+1)+l+1) \cdot (2 \cdot N_{ID}^{cell}+1)$;

$c_{init} = (7 \cdot (n_s+1)+l+1) \cdot (2 \cdot N_{ID}^{cell}+1)$;

$c_{init} = 2^{10} \cdot (7 \cdot (n_s+1)+l+1) \cdot (2 \cdot N_{ID}^{cell}+1) + 2 \cdot N_{ID}^{cell} N_{CP}$;

$c_{init} = 2^{10} \cdot (7 \cdot (n_s+1)+l+1) \cdot (2 \cdot N_{ID}^{cell}+1) + N_{CP}$;

$c_{init} = 2 \cdot (7 \cdot (n_s+1)+l+1) \cdot (2 \cdot N_{ID}^{cell}+1) + N_{CP}$;

$c_{init} = 2^9 \cdot (7 \cdot (n_s+1)+l+1) \cdot (2 \cdot N_{ID}^{cell}+1) \cdot (2 \cdot \lfloor ANTPORT/4 \rfloor+1) + N_{ID}^{cell}$;

$c_{init} = 2^9 \cdot (7 \cdot (n_s+1)+l+1) \cdot (2 \cdot N_{ID}^{cell}+1) \cdot (2 \cdot \lfloor ANTPORT/2 \rfloor+1) + N_{ID}^{cell}$;

$c_{init} = (7 \cdot (n_s+1)+l+1) \cdot (2 \cdot N_{ID}^{cell}+1) \cdot (2 \cdot \lfloor ANTPORT/4 \rfloor+1)$;

$c_{init}=(7\cdot(n_s+1)+l+1)\cdot(2\cdot N_{ID}^{cell}+1)\cdot(2\cdot\lfloor ANTPORT/2\rfloor+1)$;

$c_{init}=4\cdot(7\cdot(n_s+1)+l+1)\cdot(2\cdot N_{ID}^{cell}+1)+\lfloor ANTPORT/2\rfloor$;

$c_{init}=2\cdot(7\cdot(n_s+1)+l+1)\cdot(2\cdot N_{ID}^{cell}+1)+\lfloor ANTPORT/4\rfloor$;

$c_{init}=2^9\cdot(7\cdot(n_s+1)+l+1)\cdot(2\cdot N_{ID}^{cell}+1)+\lfloor ANTPORT/2\rfloor$;

$c_{init}=2^9\cdot(7\cdot(n_s+1)+l+1)\cdot(2\cdot N_{ID}^{cell}+1)+\lfloor ANTPORT/4\rfloor$;

$c_{init}=2^{10}\cdot(7\cdot(n_s+1)+l+1)\cdot(2\cdot N_{ID}^{cell}+1)+\lfloor ANTPORT/2\rfloor$;

$c_{init}=2^{10}\cdot(7\cdot(n_s+1)+l+1)\cdot(2\cdot N_{ID}^{cell}+1)+\lfloor ANTPORT/4\rfloor$;

$c_{init}=2^{10}\cdot(7\cdot(n_s+1)+l+1)\cdot(2\cdot N_{ID}^{cell}+1)+\lfloor ANTPORT/2\rfloor$;

$c_{init}=2^{10}\cdot(7\cdot(n_s+1)+l+1)\cdot(2\cdot N_{ID}^{cell}+1)+2\cdot N_{ID}^{cell}+\lfloor ANTPORT/4\rfloor$;

$c_{init}=2^{11}\cdot(7\cdot(n_s+1)+l+1)\cdot(2\cdot N_{ID}^{cell}+1)+4\cdot N_{ID}^{cell}+\lfloor ANTPORT/2\rfloor$;

$c_{init}=2^{10}\cdot(7\cdot(n_s+1)+l+1)\cdot(2\cdot N_{ID}^{cell}+1)\cdot(2\cdot\lfloor ANTPORT/4\rfloor+1)+2N_{ID}^{cell}+N_{CP}$;

$c_{init}=2^{10}\cdot(7\cdot(n_s+1)+l+1)\cdot(2\cdot N_{ID}^{cell}+1)\cdot(2\cdot\lfloor ANTPORT/2\rfloor+1)+2N_{ID}^{cell}+N_{CP}$;

$c_{init}=2\cdot(7\cdot(n_s+1)+l+1)\cdot(2\cdot N_{ID}^{cell}+1)\cdot(2\cdot\lfloor ANTPORT/4\rfloor+1)+1)+N_{CP}$;

$c_{init}=8\cdot(7\cdot(n_s+1)+l+1)\cdot(2\cdot N_{ID}^{cell}+1)+2\cdot\lfloor ANTPORT/2\rfloor+N_{CP}$;

$c_{init}=4\cdot(7\cdot(n_s+1)+l+1)\cdot(2\cdot N_{ID}^{cell}+1)+2\cdot\lfloor ANTPORT/4\rfloor+N_{CP}$;

$c_{init}=2^9\cdot(7\cdot(n_s+1)+l+1)\cdot(2\cdot N_{ID}^{cell}+1)+2\cdot\lfloor ANTPORT/2\rfloor+N_{CP}$;

$c_{init}=2^9\cdot(7\cdot(n_s+1)+l+1)\cdot(2\cdot N_{ID}^{cell}+1)+2\cdot\lfloor ANTPORT/4\rfloor+N_{CP}$;

$c_{init}=2^{10}\cdot(7\cdot(n_s+1)+l+1)\cdot(2\cdot N_{ID}^{cell}+1)+2\cdot\lfloor ANTPORT/4\rfloor+N_{CP}$;

$c_{init}=2^{10}\cdot(7\cdot(n_s+1)+l+1)\cdot(2\cdot N_{ID}^{cell}+1)+2\cdot\lfloor ANTPORT/2\rfloor+N_{CP}$;

$c_{init}=2^9\cdot(7\cdot(n_s+1)+l+1)\cdot(2\cdot N_{ID}^{cell}+1)\cdot 2\cdot ANTPORTNUM+1)+N_{ID}^{cell}$;

$c_{init}=2^9\cdot(7\cdot(n_s+1)+l+1)\cdot(2\cdot N_{ID}^{cell}+1)\cdot 2\cdot ANTPORTNUM+1)$;

$c_{init}=2^{11}\cdot(7\cdot(n_s+1)+l+1)\cdot(2\cdot N_{ID}^{cell}+1)+4N_{ID}^{cell}+ANTPORTNUM$;

$c_{init}=2^9\cdot(7\cdot(n_s+1)+l+1)\cdot(2\cdot N_{ID}^{cell}+1)+ANTPORTNUM$;

$c_{init}=4\cdot(7\cdot(n_s+1)+l+1)\cdot(2\cdot N_{ID}^{cell}+1)+ANTPORTNUM$;

$c_{init}=2^9\cdot(7\cdot(n_s+1)+l+1)\cdot(2\cdot N_{ID}^{cell}+1)\cdot(2\cdot ANTPORTNUM+1)+N_{ID}^{cell}$;

$c_{init}=2^{11}\cdot(7\cdot(n_s+1)+l+1)\cdot(2\cdot N_{ID}^{cell}+1)+4N_{ID}^{cell}+ANTPORTNUM$;

$c_{init}=2^{12}\cdot(7\cdot(n_s+1)+l+1)\cdot(2\cdot N_{ID}^{cell}+1)+8N_{ID}^{cell}+4N_{CP}+ANTPORTNUM$;

$c_{init}=2^9\cdot(7\cdot(n_s+1)+l+1)\cdot(2\cdot N_{ID}^{cell}+1)+4N_{CP}+ANTPORTNUM$;

$c_{init}=8\cdot(7\cdot(n_s+1)+l+1)\cdot(2\cdot N_{ID}^{cell}+1)+4N_{CP}+ANTPORTNUM$;

$c_{init}=2^{12}\cdot(7\cdot(n_s+1)+l+1)\cdot(2\cdot N_{ID}^{cell}+1)+8N_{ID}^{cell}+2ANTPORTNUM+N_{CP}$;

$c_{init}=2^9\cdot(7\cdot(n_s+1)+l+1)\cdot(2\cdot N_{ID}^{cell}+1)+2ANTPORTNUM+N_{CP}$;

$c_{init}=8\cdot(7\cdot(n_s+1)+l+1)\cdot(2\cdot N_{ID}^{cell}+1)+2ANTPORTNUM+N_{CP}$;

$c_{init}=2^{11}\cdot(7\cdot(n_s+1)+l+1)\cdot(2\cdot N_{ID}^{cell}+1)(2\cdot\lfloor ANTPORT/4\rfloor+1)+4N_{ID}^{cell}+ANTPORTNUM$;

$c_{init}=2^9\cdot(7\cdot(n_s+1)+l+1)\cdot(2\cdot N_{ID}^{cell}+1)(2\cdot\lfloor ANTPORT/4\rfloor+1)+ANTPORTNUM$;

$c_{init}=4\cdot(7\cdot(n_s+1)+l+1)\cdot(2\cdot N_{ID}^{cell}+1)(2\cdot\lfloor ANTPORT/4\rfloor+1)+ANTPORTNUM$;

$c_{init}=2^{10}\cdot(7\cdot(n_s+1)+l+1)\cdot(2\cdot N_{ID}^{cell}+1)+8\cdot\lfloor ANTPORT/4\rfloor+ANTPORTNUM$;

$c_{init}=2^{10}\cdot(7\cdot(n_s+1)+l+1)\cdot(2\cdot N_{ID}^{cell}+1)+8\cdot\lfloor ANTPORT/2\rfloor+ANTPORTNUM$;

$c_{init}=2^9\cdot(7\cdot(n_s+1)+l+1)\cdot(2\cdot N_{ID}^{cell}+1)(2\cdot\lfloor ANTPORT/4\rfloor+1)+8N_{ID}^{cell}+4N_{CP}+ANTPORTNUM$;

$c_{init}=2^9\cdot(7\cdot(n_s+1)+l+1)\cdot(2\cdot N_{ID}^{cell}+1)(2\cdot\lfloor ANTPORT/4\rfloor+1)+4N_{CP}+ANTPORTNUM$;

$c_{init}=2^{12}\cdot(7\cdot(n_s+1)+l+1)\cdot(2\cdot N_{ID}^{cell}+1)(2\cdot\lfloor ANTPORT/4\rfloor+1)+8N_{ID}^{cell}+2ANTPORTNUM+N_{CP}$;

$c_{init}=2^9\cdot(7\cdot(n_s+1)+l+1)\cdot(2\cdot N_{ID}^{cell}+1)(2\cdot\lfloor ANTPORT/4\rfloor+1)+1)+2ANTPORTNUM+N_{CP}$;

$c_{init}=8\cdot(7\cdot(n_s+1)+l+1)\cdot(2\cdot N_{ID}^{cell}+1)(2\cdot\lfloor ANTPORT/4\rfloor+1)+1)+2ANTPORTNUM+N_{CP}$;

$c_{init}=2^{10}\cdot(7\cdot(n_s+1)+l+1)\cdot(2\cdot N_{ID}^{cell}+1)+8\cdot\lfloor ANTPORT/2\rfloor+ANTPORTNUM+N_{CP}$;

wherein, $n_s$ is the time slot index in one radio frame, l is an OFDM index in one time slot, $N_{ID}^{cell}$ is the cell ID, and $N_{CP}$ is the Cyclic Prefix (CP) length factor of one subframe, when the subframe is a normal CP subframe, $N_{CP}=1$, when the subframe is an extended CP subframe, $N_{CP}=0$; ANTPORT is the CSI-RS antenna port index related parameter, and ANTPORTNUM is the CSI-RS antenna port number related parameter of cell.

9. The UE according to claim 6, wherein
the generating unit is configured to generate the pseudo-random sequence c(n) based on the OFDM symbol in accordance with following ways:

$c(n)=(x_1(n+N_C)+x_2(n+N_C))\bmod 2$ $x_1(n+31)=(x_1(n+3)+x_1(n))\bmod 2$ $x_2(n+31)=(x_2(n+3)+x_2(n+2)+x_2(n+1)+x_2(n))\bmod 2$ wherein, $x_1(0)=1$, $x_1(n)=0$, $n=1, 2, \ldots, 30$, $N_C=1600$, $x_2(n)=0$, $n=0, 1, 2, \ldots, 30$ are produced according to the pseudo-random sequence initial value $c_{init}=\Sigma_{q=0}^{30} x_2(q)\cdot 2^q$, and mod is a modular arithmetic; and the generating unit is configured to obtain the first CSI-RS sequence r(m) based on the OFDM symbol in accordance with following ways:

$$r(m) = \frac{1}{\sqrt{2}}(1 - 2 \cdot c(2m)) + j\frac{1}{\sqrt{2}}(1 - 2 \cdot c(2m+1)),$$

$$m = 0, 1, \ldots, N_{RB}^{max,DL} - 1$$

or $$r(m) = \frac{1}{\sqrt{2}}(1 - 2 \cdot c(2m)) + j\frac{1}{\sqrt{2}}(1 - 2 \cdot c(2m+1)),$$

$$m = \left\lceil \frac{1}{2}N_{RB}^{max,DL} \right\rceil, \ldots, \left\lceil \frac{3}{2}N_{RB}^{max,DL} \right\rceil - 1$$

wherein, $N_{RB}^{max,DL}$ is the maximum bandwidth of the system, $N_{RB}^{max,DL}=110$.

10. The UE according to claim 9, wherein,
the mapping acquiring unit is configured to obtain the second CSI-RS sequence based on the OFDM symbol in accordance with following ways:
calculating a location index i' according to the actual bandwidth $N_{RB}^{DL}$ of the system and cutting the first CSI-RS sequence r(m) in accordance with the location index i' to obtain the second CSI-RS sequence $r_{l,n_s}$(i') of the OFDM symbol l on time slot $n_s$;
the mapping acquiring unit is further configured to: map the second CSI-RS sequence $r_{l,n_s}$(i') to a subcarrier k of the OFDM symbol l of the CSI-RS antenna port p via $a_{k,l}^{(p)}=w_{l''} \cdot r_{l,n_s}$(i'), wherein $a_{k,l}^{(p)}$ is a value of Resource Element (RE) corresponding to the CSI-RS antenna port p, and $w_{l''}$ is an orthogonal code factor.

11. The UE according to claim 10, wherein the location index is $$i' = i + \frac{\lfloor N_{RB}^{max,DL} - N_{RB}^{DL} \rfloor}{2}, i = 0, 1, \ldots, N_{RB}^{DL} - 1;$$

the mapping acquiring unit is configured to map the second CSI-RS sequence $r_{l,n_s}$(i') to the subcarrier k of the OFDM symbol l of the CSI-RS antenna port p in accordance with following ways:

$$k = k' + 12i + \begin{cases} -0 & p \in \{15, 16\}, \text{normal } CP \\ -6 & p \in \{17, 18\}, \text{normal } CP \\ -1 & p \in \{19, 20\}, \text{normal } CP \\ -7 & p \in \{21, 22\}, \text{normal } CP \\ -0 & p \in \{15, 16\}, \text{extended } CP \\ -3 & p \in \{17, 18\}, \text{extended } CP \\ -6 & p \in \{19, 20\}, \text{extended } CP \\ -9 & p \in \{21, 22\}, \text{extended } CP, \end{cases}$$

$$l = l' + \begin{cases} l'' & \text{when using normal } CP, CSI - RS \text{ configuration index is } 0 \sim 19 \\ 2l'' & \text{when using normal } CP, CSI - RS \text{ configuration index is } 20 \sim 31 \\ l'' & \text{when using extended } CP, CSI - RS \text{ configuration index is } 0 \sim 27, \end{cases}$$

$$l'' \in \{0, 1\},$$

$$w_{l'} = \begin{cases} 1 & p \in \{15, 17, 19, 21\} \\ (-1)^{l''} & p \in \{16, 18, 20, 22\}, \end{cases}$$

wherein, k' is a frequency domain location of first CSI-RS antenna port, l' is an initial time domain location of the first CSI-RS antenna port, and the first CSI-RS sequence r(m) is $$r(m) = \frac{1}{\sqrt{2}}(1 - 2 \cdot c(2m)) + j\frac{1}{\sqrt{2}}(1 - 2 \cdot c(2m+1)),$$

$$m = 0, 1, \ldots, N_{RB}^{max,DL} - 1.$$

\* \* \* \* \*